(12) United States Patent
De Kievit et al.

(10) Patent No.: US 12,107,950 B2
(45) Date of Patent: Oct. 1, 2024

(54) METHOD AND A DEVICE FOR ENABLING KEY RE-USAGE IN A COMMUNICATION NETWORK

(71) Applicant: NEC Corporation, Tokyo (JP)

(72) Inventors: Sander De Kievit, Tokyo (JP); Sheeba Backia Mary Baskaran, Tamil Nadu (IN); Anand Raghawa Prasad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/421,363

(22) PCT Filed: Dec. 19, 2019

(86) PCT No.: PCT/JP2019/049720
§ 371 (c)(1),
(2) Date: Jul. 7, 2021

(87) PCT Pub. No.: WO2020/145064
PCT Pub. Date: Jul. 16, 2020

(65) Prior Publication Data
US 2022/0417010 A1    Dec. 29, 2022

(30) Foreign Application Priority Data
Jan. 11, 2019    (IN) .............................. 201911001407

(51) Int. Cl.
*H04L 9/08* (2006.01)
*H04L 9/32* (2006.01)
(52) U.S. Cl.
CPC .......... *H04L 9/0825* (2013.01); *H04L 9/0838* (2013.01); *H04L 9/3242* (2013.01)
(58) Field of Classification Search
None
See application file for complete search history.

(56) References Cited

U.S. PATENT DOCUMENTS

| 6,711,264 B1 * | 3/2004 | Matsumoto ............... H04L 9/14 380/283 |
| 2009/0054036 A1 | 2/2009 | Chen et al. |

(Continued)

FOREIGN PATENT DOCUMENTS

| CN | 107820244 A | 3/2018 |
| CN | 109104727 | * 12/2018 |

(Continued)

OTHER PUBLICATIONS

JP Office Action for JP Application No. 2021-538350, mailed on Aug. 9, 2022 with English Translation.

(Continued)

*Primary Examiner* — Bassam A Noaman

(57) ABSTRACT

The present disclosure relates to method of enabling key re-usage for an electronic device. The method comprising: receiving a request message from the electronic device, wherein the request message comprises a first information being indicative of a preference for one of a first key associated with a first network node in a first network or a second key associated with a second network node in a second network; processing the request message to determine the preference indicated in the first information; and transmitting a response message to the electronic device for reusing the first key or second key, the electronic device is configured to derive a third key based on the first key or the second key as indicated in the determined preference, and the second network is able to access to the first key and the second key whereas the first network cannot access the second key.

14 Claims, 25 Drawing Sheets

(56) References Cited

U.S. PATENT DOCUMENTS

| | | | |
|---|---|---|---|
| 2016/0094542 A1 | 3/2016 | Lee et al. | |
| 2018/0227302 A1* | 8/2018 | Lee | H04L 9/083 |
| 2018/0343249 A1 | 11/2018 | Hahn et al. | |
| 2019/0098502 A1* | 3/2019 | Torvinen | H04L 9/3242 |
| 2019/0261178 A1* | 8/2019 | Rajadurai | H04W 12/069 |
| 2020/0280435 A1* | 9/2020 | Lehtovirta | H04L 9/0822 |
| 2020/0359203 A1* | 11/2020 | Aono | H04W 8/12 |
| 2021/0297400 A1* | 9/2021 | Lehtovirta | H04L 63/065 |

FOREIGN PATENT DOCUMENTS

| | | |
|---|---|---|
| WO | 2009/050924 A1 | 4/2009 |
| WO | 2010/092764 A1 | 8/2010 |
| WO | 2018/187937 A1 | 10/2018 |

OTHER PUBLICATIONS

Samsung, "Correction to Key hierarchy diagram", 3GPP TSG SA WG3(security) Meeting #93, Nov. 12-16, 2018, Spokane (US), Change Request 33.501, Internet <URL:https://www.3gpp.org/ftp/tsg_sa/TSG_SA/TSGS_82/Docs/SP-181025.zip>, CR 0470 rev 1 Current version: 15.2.0. Nov. 12. 2018.
International Search Report for PCT Application No. PCT/JP2019/049720, mailed on Apr. 21, 2020.
3rd Generation Partnership, "Technical Specification Group Services and System Aspects, Study on authentication and key management for applications, based on 3GPP credential in 5G (Release 16)", 3GPP TR 33.835 V0.2.0, Nov. 2018, pp. 1-34.
3rd Generation Partnership Project, "Technical Specification Group Services and System Aspects, Generic Authentication Architecture (GAA), Generic Bootstrapping Architecture (GBA) (Release 15)", 3GPP TS 33.220 V15.4.0, Dec. 2018, pp. 1-93.
3rd Generation Partnership Project, "Technical Specification Group Services and System Aspects, Battery Efficient Security for very low Throughput Machine Type Communication (MTC) devices (BEST), (Release 15)", 3GPP TS 33.163 V15.4.0, Sep. 2018, pp. 1-40.
3rd Generation Partnership Project, "Technical Specification Group Services and System Aspects, Study on battery efficient security for very low throughput Machine Type Communication (MTC) devices (Release 14)", 3GPP TR 33.863 V14.2.0, Jun. 2017.
3rd Generation Partnership Project, "Technical Specification Group Services and System Aspects, Security architecture and procedures for 5G system (Release 15)", 3GPP TS 33.501 V15.3.1, Dec. 2018, pp. 1-182.
3rd Generation Partnership Project, "Technical Specification Group Services and System Aspects, Service requirements for Machine-Type Communications (MTC), Stage 1 (Release 13)", 3GPP TS 22.368 V13.1.0, Dec. 2014, pp. 1-26.

* cited by examiner ously shared with an Application Server, after which the UE and the Application Server can use the key for authenticating each other or for setting up secured communication.
METHOD AND A DEVICE FOR ENABLING KEY RE-USAGE IN A COMMUNICATION NETWORK This application is a National Stage Entry of PCT/JP2019/049720 filed on Dec. 19, 2019, which claims priority from Indian Patent Application 201911001407 filed on Jan. 11, 2019, the contents of all of which are incorporated herein by reference, in their entirety.

TECHNICAL FIELD

The present disclosure relates generally to exchanging and/or re-using key information for services provided or run on a communication network in such a way that regulatory compliance can be met.

BACKGROUND ART

3GPP SA3 has started the study on Authentication and Key Management for Applications based on 3GPP subscriber credentials (AKMA: Authentication and Key Management for Applications). A topic of this study is how applications can take advantage of the existing key material and the existing authentication mechanisms defined by 3GPP for creating shared keys between the Application Server or Application Function on the one end and the UE (User Equipment) or the application running on the UE on the other end. Such a key could be used for authenticating the application on the UE or the UE to the Application Server or Function and vice versa. Another usage of such a key is to protect the information exchange between the Application Server and the UE for example by encrypting and/or integrity protecting the information exchange.

In the context of AKMA, an architecture has been introduced to enable this service in TR 33.835. In this architecture, two more nodes are added to the existing 5G system, namely the AAuF (AKMA Authentication Function) and the AApF (AKMA Application Function). "The AAuF is responsible for authenticating the UE, generating the key material to be used between the UE and the AApF and maintaining a UE AKMA context to be used for subsequent bootstrapping requests." The AApF is the application function in the operator domain or outside the operator domain that consumes the authentication services. In order to do so, the AApF interacts with the AAuF to request key material from the AAuF whenever a UE requests services.

FIG. 1 displays two possible architecture functions. One where the AAuF is connected to the UDM (Unified Data Management) and one where the AAuF is connected to the AUSF (Authentication Server Function).

In many ways, this service is similar to the services GBA (Generic Bootstrapping Architecture) and BEST (Battery Efficient Security for very low Throughput Machine Type Communication (MTC) device) that are specified in TS 33.220 and TS 33.163 respectively. In BEST and GBA, the UE sends a service request to a node in the home network (HN), which in turn fetches an Authentication Vector from the subscriber data base (such as the HSS (Home Subscriber System) in an Evolved Packet Core and the HLR (Home Location Register) in UMTS (Universal Mobile Telecommunications System) and GSM (Global System for Mobile Communications)) and initiates an authentication run with the UE. As the result of a successful authentication, the node in the home network (called BSF (Bootstrapping server function) in GBA and HSE (HPLMN Security Endpoint) in BEST) and the UE establish a shared key that is unknown to any parties in between, such as the serving network. This key or a derivative thereof is subsequently shared with an Application Server, after which the UE and the Application Server can use the key for authenticating each other or for setting up secured communication.

CITATION LIST

Non Patent Literature

NPL 1: 3GPP TR 33.835 V0.2.0 (2018-11)
NPL 2: 3GPP TS 33.220 V15.4.0 (2018-12)
NPL 3: 3GPP TS 33.163 V15.4.0 (2018-09)
NPL 4: 3GPP TR 33.863 V14.2.0 (2017-06)
NPL 5: 3GPP TS 33.501 V15.3.1 (2018-12)
NPL 6: 3GPP TS 22.368 V13.1.0 (2014-12)

SUMMARY OF INVENTION

Technical Problem

The above mechanism has a number of shortcomings. Firstly, a new authentication run is necessary for each time the service is invoked, even if the UE just authenticated to the network. This is highly inefficient. Secondly, the serving network may have regulatory obligations to decrypt information that is exchanged between the UE and the Application Server. Given the fact that the serving network in principle has no access to the key material, the service would either have to be blocked or other means would have to be put in place to obtain the key material.

This problem can only be partly overcome by utilizing the new key hierarchy in 5G as is shown in FIG. 2. First, the need for new authentication can be overcome by basing any service on already existing keys in 5G which are established after successful authentication between the network and the UE. For example, the $K_{AUSF}$, which is a key in the home network, could be used as a root key for the AKMA services. Also, $K_{SEAF}$ or $K_{AMF}$, which is a key in the serving network, could be used as a root key for AKMA related services. However, this can only be achieved if the keys are stored after the authentication between the UE and the network has been completed run and if the keys are made available to the node running the AKMA services. Second, the regulatory compliance could be solved by using the $K_{SEAF}$ as the root key for AKMA services. However, in such a case, the communication would be compromised. Further, regulatory requirements do not demand that a serving network key is used for AKMA related services. Therefore, using $K_{AKMA}$ based on $K_{SEAF}$ is not a necessary solution.

As such, the problem that need to be solved is:
How the UE and network can decide on which key to use, irrespective of whether this particular key is still available in the network or the UE and in view of the potential presence of legacy SEAF (Security Anchor Functionality) and/or AMF (Access and Mobility Management Function) and/or AUSF (Authentication Server Function).

Some exemplary embodiments of the disclosure will require the keys to be identified. In TR 33.863, solution 6.1 proposes a method to identify CK (Cipher Key) and IK (Integrity Key) of an authentication run by calculating a key set identifier from CK and IK and using this key set identifier as a pointer to the keys. This solution, however, has the short coming that it can only identify the one key set from one authentication run. It does not identify either $K_{SEAF}$ or $K_{AUSF}$ in 5G context.

Most of the embodiments assume that the way AKMA will work is similar to BEST and GBA. That means that the procedure to set up secured communication between the UE and the an Application Server or Function (called AKMA Application Function—AApF) will first go through a setup phase (called bootstrapping in GBA) where the UE and an authentication server in the network, called the AKMA Authentication Function (AAuF) agree on the key material to be used. The second phase is the actual usage phase where the UE and the AApF use the key material for their decided usage.

Thus, there is a need to consider on the usage of the appropriate keys for AKMA, i.e. either based on a home network key like the $K_{AUSF}$ or based on a serving network key, like $K_{SEAF}$.

The AKMA architecture need to support key separation for different AKMA Application Functions to prevent one AKMA AF from decrypting traffic intended for another AKMA AF. It is introduced to use either the AKMA AF Counter or a Random Value to enable key separation between AKMA AFs.

Solution to Problem

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter.

Its sole purpose is to present some concepts of the subject matter in a simplified form as a prelude to the more detailed description that is presented later.

According to an embodiment of the present disclosure, method of enabling key re-usage for an electronic device is disclosed, where the method comprises: receiving a request message from the electronic device, wherein the request message comprises a first information being indicative of a preference for one of a first key associated with a first network node in a first network or a second key associated with a second network node in a second network; processing the request message to determine the preference indicated in the first information; and transmitting a response message to the electronic device for reusing the first key or second key, wherein the electronic device is configured to derive a third key based on the first key or the second key as indicated in the determined preference, and wherein the second network is able to access the first key and the second key and the first network is unable to access the second key.

Further, according to an embodiment of the present disclosure, the request message comprises a second information being indicative of the electronic device holding at least one of the first key or the second key, a third information being indicative of identity of a key established during a previous communication session or a fourth information being indicative of local policy.

Yet, in another embodiment of the present disclosure, the method comprises: setting up an authentication pattern using the first key or the second key based on preferences of the UE; and obtaining one of the first key or the second key chosen by the first network or the second network based on the first information.

In an embodiment of the present disclosure, a method of enabling key re-usage for an electronic device at a network other than home network is disclosed, where the method comprises: sending a service request to the network other than the home network; receiving a service response in respect of the service request; and performing an authentication based on the received service response.

In an embodiment of the present disclosure, wherein the method comprises: verifying a key present in the service request in respect of the network other than the home network; verifying a home network in an event of failure of verification of the key; and receiving an authorization request in an event of failure of verification with the home network.

In an embodiment of the present disclosure, the method comprises: verifying the received service response; calculating an appropriate key based on the verification; and authenticating the service response based on the calculated key.

In an embodiment of the present disclosure, the service response comprises at least one of a set of parameter, a message authentication code, or a key indicator.

In an embodiment of the present disclosure, a method of enabling key re-usage for an electronic device in a network is disclosed, where the method comprises: transmitting at least one session request message to a first network node, wherein the at least one session request message comprises a flag to indicate the electronic device's preference to use a key based on an authentication key associated with a second network node, wherein the flag is forwarded to a third network node in form of at least one key request, and wherein the third network node sends at least one response message to the first network node upon successful verification of the at least one key request; and receiving a message from the first network node indicating the session to commence.

In an embodiment of the present disclosure, the second network node and the third network node are the same network node.

In an embodiment of the present disclosure, the at least one session request message comprises at least one of an ID, a flag, an authentication key of the server, a key set identifier, or a message authentication code.

In an embodiment of the present disclosure, the at least one key request message comprises at least one of an ID, an authentication key of the server, a key set identifier, or a message authentication code.

In an embodiment of the present disclosure, the at least one key response message comprises at least one of an authentication key of the server, a challenge code, or a verified response message.

In an embodiment of the present disclosure, wherein either a challenge code or an authentication key specific counter is used for key separation in an event of a plurality of the authentication server.

In an embodiment of the present disclosure, a network node for communication with an electronic device, the network node comprising: a controller; and a memory operatively coupled with the controller, wherein the controller is configured to: receive a request message from the electronic device; process the request message to have a result for implementing of an authentication based on a set of parameters; and transmit the result to the electronic device for deriving a set of authentication keys.

In an embodiment of the present disclosure, an electronic device for re-using a key with a network, the electronic device comprising: a controller; and a memory operatively coupled with the controller, wherein the controller is configured to: send a service request to the network; receive a service response in respect of the service request; and perform an authentication based on the received service response.

These and other objects, embodiments and advantages of the present disclosure will become readily apparent to those skilled in the art from the following detailed description of the embodiments having reference to the attached figures, the disclosure not being limited to any particular embodiments disclosed.

BRIEF DESCRIPTION OF DRAWINGS

The foregoing and further objects, features and advantages of the present subject matter will become apparent from the following description of exemplary embodiments with reference to the accompanying drawings, wherein like numerals are used to represent like elements.

It is to be noted, however, that the appended drawings along with the reference numerals illustrate only typical embodiments of the present subject matter, and are therefore, not to be considered for limiting of its scope, for the subject matter may admit to other equally effective embodiments.

DESCRIPTION OF EMBODIMENTS

Figure 1:
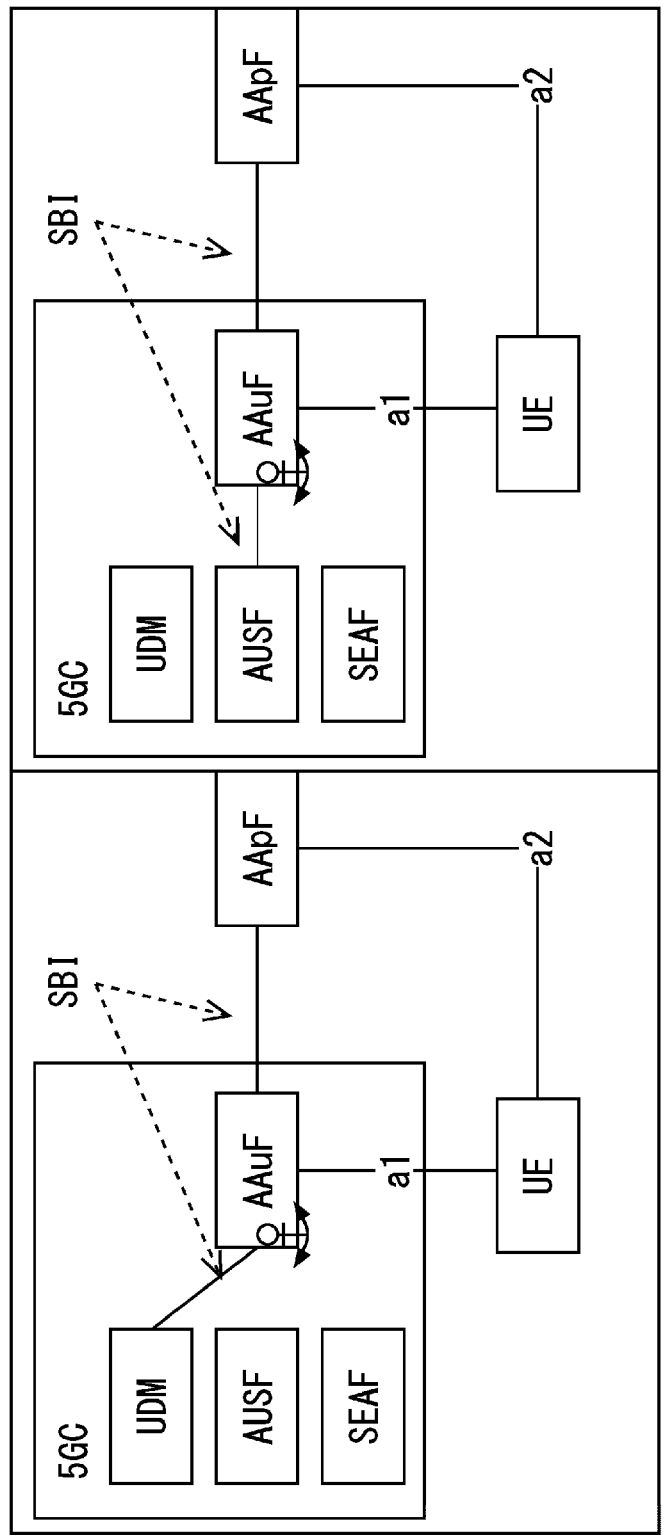
FIG. 1 illustrates an architecture where the AAuF is connected to the UDM or AUSF.
Figure 2:
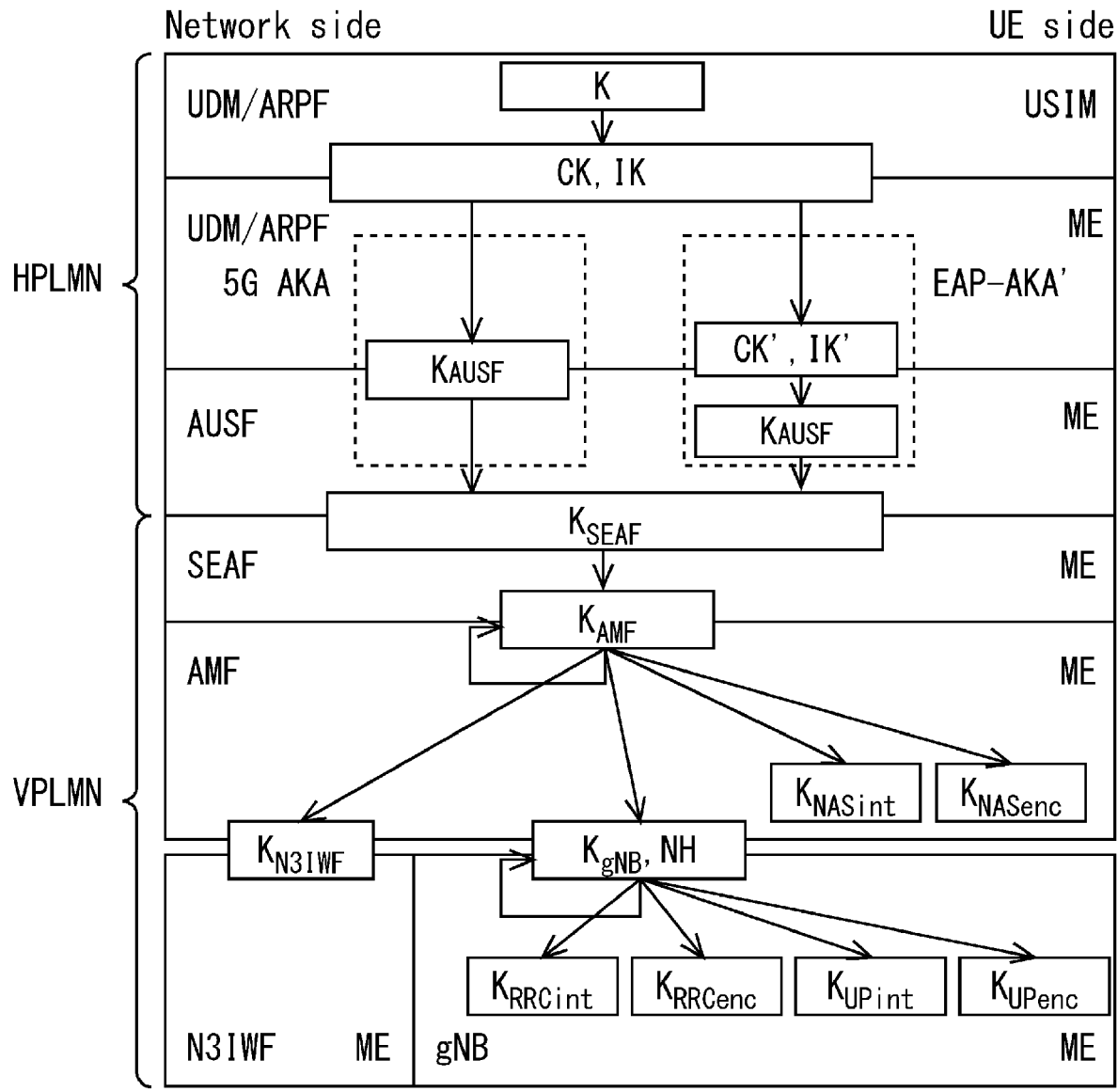
FIG. 2 illustrates key hierarchy in 5G technology according to an embodiment of the present disclosure.

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

It is to be noted, however, that the reference numerals in claims illustrate only typical embodiments of the present subject matter, and are therefore, not to be considered for limiting of its scope, for the subject matter may admit to other equally effective embodiments.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the figures include the software and/or hardware components required for the unit to function. Further, each unit may comprise, within itself, one or more components which are implicitly understood. These components may be operatively coupled to each other and be configured to communicate with each other to perform the function of the said unit.

In 5G system architecture, a variety of configurations of elements i.e., the network function (NF) may comprise such as the authentication server function (AUSF), authentication Credential Repository and processing function (ARPF), Access and Mobility Management Function (AMF), Session Management Function (SMF), Policy Control Function (PCF), Application Function (AF), Integrated Data Management (UDM), Data Network (DN), User Plane Functions (UPF), Radio Access Network (RAN), User Equipment (UE) and the like.

Further, protocol used in the present disclosure may include at least one of RRC (Radio Resource Control) protocol, N2 signaling protocol, NAS (Non-Access Stratum) protocol, or signaling Protocol between the access terminal and a Security Anchor Function (SEAF) entity. The network node is at least one of a SEAF entity, an Authentication Management Field (AMF) entity or an Authentication Server Function (AUSF) entity. The network is at least one of a 5G Core network (5GC), a NG Radio Access Network (NG-RAN), an Evolved Packet Core (EPC), a Long Term Evolution (LTE) system or a next generation network system. Furthermore, a home subscriber server (HSS) stores the pre security requirements of the user using user equipment (UE). The home subscriber server, according to user identifier, determines the preset security requirements of the UE.

First Embodiment

Figure 3:
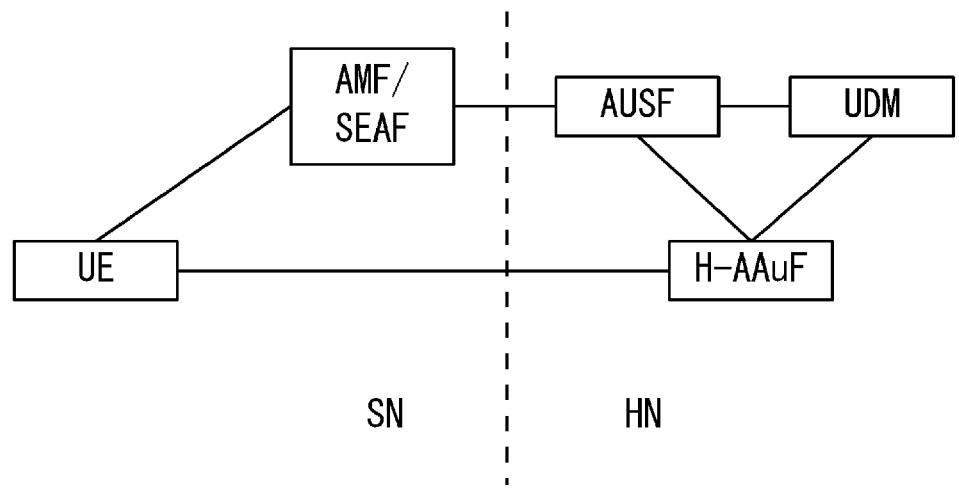
FIG. 3 shows an architecture with AAuF only in the home network in accordance with the present disclosure.

FIG. 3 shows an architecture where the AAuF resides in the home network. This architecture applies when there is no AAuF positioned in the visited network or if the UE has been configured to contact the AAuF residing in the home network.

The architecture in FIG. 3 shows a simplified, but generic architecture for 5G. In the serving network (denoted with SN), the network functions AMF and SEAF are displayed. The UE is connected to the serving network, which is indicated by the line between the UE and the AMF. This line is representation of the NAS connection and NAS security context that the UE has with the AMF. In this architecture, the SEAF is shown as collocated with the AMF, however the same function could also be standalone in the future. The lines in the figure indicate that the respective elements are connected through wired, wireless, optical, etc. communication means. The connections can also be logical such as for example the line between the UE and the AMF.

The AMF/SEAF is communicatively connected to the AUSF. This line indicates that the AMF/SEAF can obtain key material from the AUSF for example to authenticate the UE when it attaches to the serving network. The AUSF resides in the home network, however, it is also possible that, in the future, parts of the AUSF functionality may reside in the serving or visited network. The AUSF is connected to the UDM in order to fetch authentication data from the UDM when the UE needs to be authenticated.

In FIG. 3, the UE is also connected to the AAuF in the home network (denoted by H-AAuF) as also shown in FIG. 1 (denoted as interface a1). For simplicity, the H-AAuF is shown to be communicatively connected to the AUSF and the UDM. From FIG. 1, it becomes apparent that the H-AAuF may be connected to only one of the elements. Some embodiments may require both the connections to the UDM and the AUSF in order to recover from error states. An advantage of connecting the H-AAuF to both the UDM and the AUSF is that, in case the AUSF may not be able to deliver a key to the H-AAuF, for example because it has lost the key or because it had never stored the key in the first place, the H-AAuF can fetch authentication vectors from the UDM and authenticate the UE in order to generate fresh key material. Such a setup allows the AAuF to recover from errors in the AUSF, but also to be used in case the UE is not connected to a 5G network but rather connects from a 4G, 3G or other type of access network.

Figure 4:
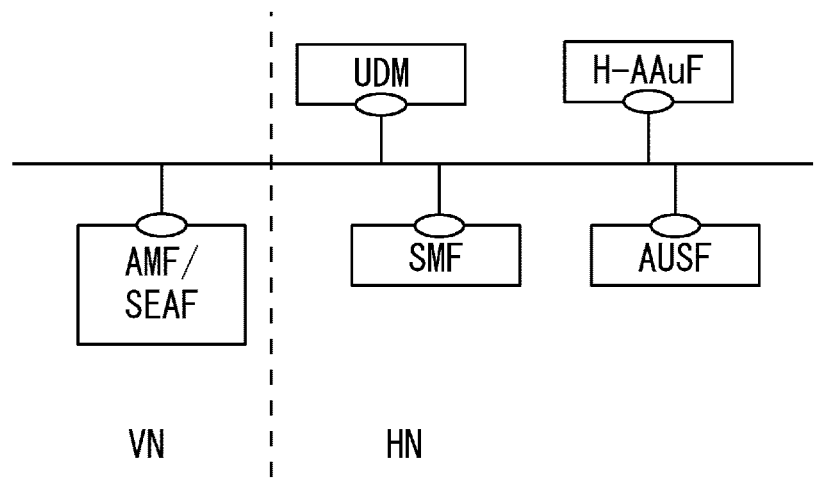
FIG. 4 shows service based representation of the 5G core network architecture in accordance with the present disclosure.

FIG. 4 shows another architectural representation of the core network also shown in FIG. 3. This representation is service based, which is one of the architectural options for 5G. In the service based architecture, the different network elements offer services on a service bus. Typically, these services are offered through some kind of HTTP front end and service consumers send HTTP requests to this particular front end. The H-AAuF that is said to be connected to the AUSF or UDM can therefore also be said to support the interface calls to both the AUSF and the UDM. An H-AAuF that is said to be connected to the AUSF only can be said to be supporting interface calls to the AUSF only. From FIG. 4, it can be concluded that message exchanges between services can also be regarded as HTTP Request/Response pairs or Publish/Subscribe mechanisms as known in the art.

The advantage of such a service based architecture is that services can be easily added and removed from the system. For example, if a network operator would like to enable the AAuF to be able to obtain a key from the AUSF, the operator would launch a new service, say a Key Repository Service, that would expose a service based interface which the AAuF can call. When the AAuF would call the service, the Key Repository Service would respond with the appropriate key material. A logical place to run this service would be the AUSF, however, this service could also be a standalone function or integrated with any other network function in the network. A similar key repository service could also be run for keys obtained from different network elements, for example, SEAF. Further, this key repository service is offered off the AUSF or the SEAF, however, that does not preclude the usage of standalone services for the key repository.

Figure 5:
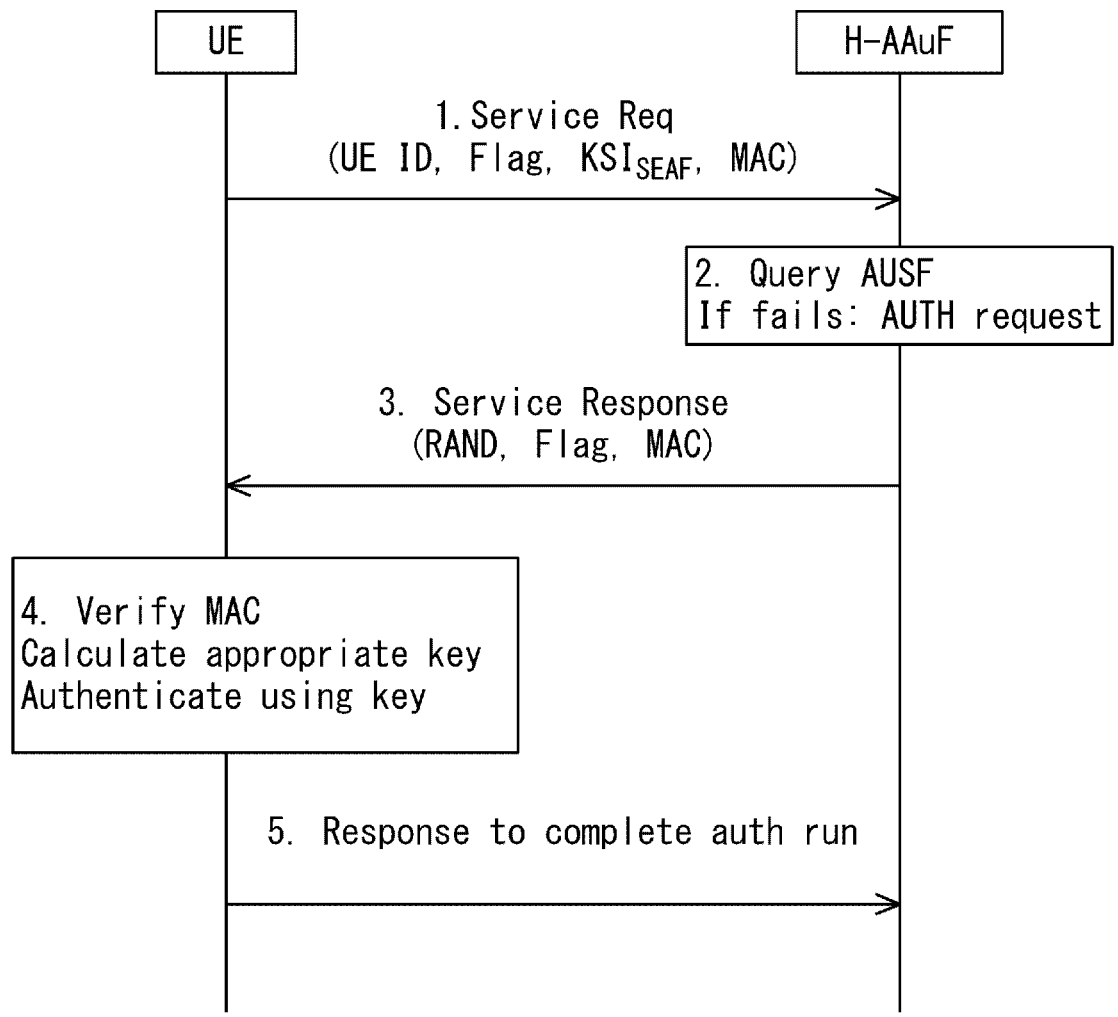
FIG. 5 shows a message exchange between the UE and the H-AAuF in accordance with the present disclosure.

FIG. 5 shows an exemplary exchange of messages between the UE and the H-AAuF. In this figure, it is assumed that the UE is connected to a network and authentication and key agreement between the serving network and the UE may have taken place. If this authentication and key agreement has taken place on a 5G network as specified in TS 33.501, the serving network has obtained the $K_{SEAF}$, $K_{AMF}$ and keys lower in the hierarchy, and the home network has calculated CK, IK and $K_{AUSF}$. If the authentication was done on other networks, such as LTE, UMTS, GSM, etc., the key hierarchy is different and different keys will have been obtained by the different nodes in such a network. For clarity, it is considered that authentication has taken place on a 5G network.

In step 1, the UE sends a message to request for service to the H-AAuF. The service request message contains an identifier of the UE, a flag for whether the UE would like to use a home network key or a serving network key, a key set identifier (KSI) and optionally a MAC that is calculated using one of the keys resulting from an earlier authentication to the network, such as for example $K_{AUSF}$ or $K_{SEAF}$ in the case of 5G.

The UE identifier in the service request message can be the permanent identifier SUPI (SUbscription Permanent Identifier) or IMSI (International Mobile Subscriber Identity), a temporary identifier 5G-GUTI (5G Globally Unique Temporary Identity) or an encrypted version of the identifier such as SUCI (Subscription Concealed Identifier) as defined in TS 33.501. The identifier can also be an MSISDN (Mobile Subscriber Integrated Services Digital Network Number), SIP (Session Initiation Protocol) address, email address, etc. as long as the H-AAuF can relate the identifier to a subscriber and recover the appropriate identifier for the service.

The flag that the UE includes can be a binary bit, where, for example, "1" indicates that the UE would like to use the home network key and "0" indicates that the UE would not like to use the home network key. The flag could also be a text field indicating the words "Home" and "Visited" or "AUSF" and "SEAF" respectively indicating that the UE would like to use a home network key or a serving network key. The flag can also be implicit and be inferred from the fact that the UE contacts the H-AAuF instead of the V-AAuF. Also, the flag could be indicated in the service name of the service that the UE invokes and the flag could also be part of a set of flags sent in the same message that indicate various options for the service. Yet another alternative, the flag can be the combinations of the keys supported by the UE for example by providing "SEAF/AUSF" as flag or "ALL" or binary representations of these values.

The KSI is a key set identifier pointing to one of the keys in the key hierarchy in 5G. For example, the key set identifier could refer to $K_{AUSF}$, $K_{SEAF}$, $K_{AMF}$, etc. Important is that both the UE and the network elements involved use the same key set identifier to refer to the same keys. One way to establish such a common reference is by sending the key identifiers from the respective elements to the UE. For example, the AUSF could send a KSI to the UE after it has authenticated, similar to how the AMF sends the key set identifier. Another way is to calculate the KSI and some other values as an input. This approach has the advantage that no new messages are necessary and that the KSI can be calculated at any point in time after the key has been established. It is assumed that the KSI is calculated as follows:

KSI=KDF(Input Key,Free text field), where the Input Key can be set to the key that one would like to refer to and the free text field can be something like "AKMA" if the KSI is specific for AKMA or "5G" if the KSI is used in the wider 5G context. Other values of the text field are also possible and additional fields may be added to avoid key repetition and key separation. The KDF is a key derivation function, which is a (cryptographic) hash function. A cryptographic hash function is used to avoid that if an attacker obtains the KSI, it is difficult to obtain the original contents and therefore the keys from which the KSI was calculated.

So, in case the UE would like to indicate that it wants to use a key based on $K_{AUSF}$ for the AKMA service, the UE would calculate or retrieve, from storage, the KSI that refers to the $K_{AUSF}$. In case the UE would like to indicate that it wants to use a key based on $K_{SEAF}$, it would use the KSI for $K_{SEAF}$. In the figure, this is indicated with $KSI_{SEAF}$.

The MAC that is included in the message is a message authentication code. Such a code is necessary to make sure that the receiving end can verify that the identity of the UE is real. The MAC can be calculated as follows:

MAC=KDF(Input Key,message,counter), which is similar to the procedure specified from Steering of Roaming in TS 33.501. In the mechanism in TS 33.501, $K_{AUSF}$ is always used as an input key, which means that only the AUSF can verify the correctness of the MAC. In our case, the input key can vary between $K_{AUSF}$, $K_{SEAF}$ and even $K_{AMF}$ according to where the message is sent (home network or visited network) and which key is assumed to be present and which key is requested. In this embodiment, however, the UE uses $K_{AUSF}$ because it sends the message to the H-AAuF which requests key material from the AUSF. As such, the AUSF can verify the message. The counter is kept at the AAuF or AUSF and at the UE.

Figure 6:
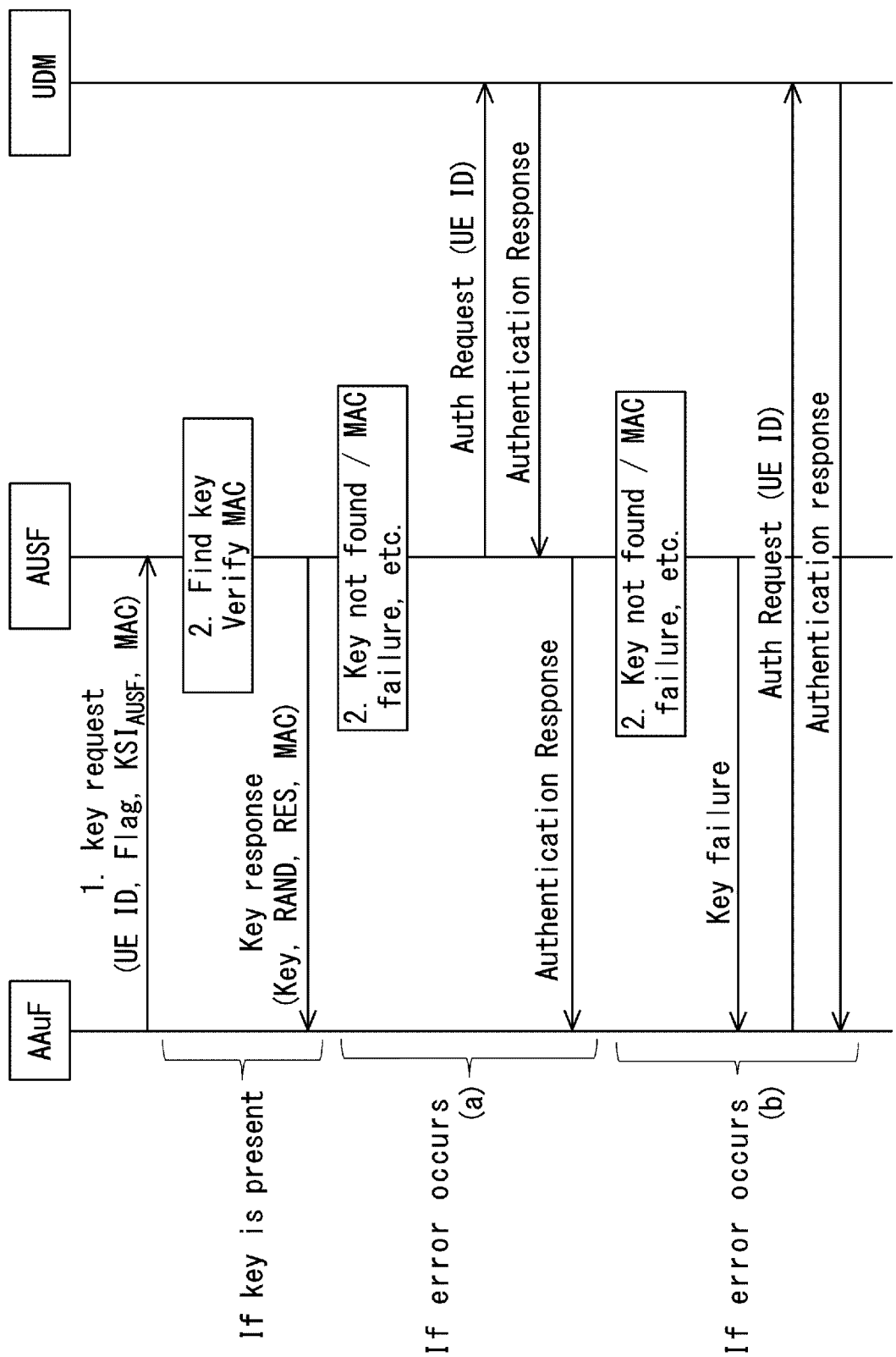
FIG. 6 illustrates a procedure for key retrieval from the AUSF in accordance with the present disclosure.

In step 2 of FIG. 5, the H-AAuF receives the message. After reception of the message, the AAuF will send a message to the AUSF asking for the key as is shown in FIG. 6. The AUSF will first try to find the key ($K_{AUSF}$ in this embodiment), then verify the MAC and subsequently respond with the appropriate key and optionally with a challenge and response. The response from the AUSF may also contain a MAC so that the UE can verify authenticity of the AUSF.

The verification of the UE message at the AUSF works as follows. First, the AUSF takes the UE ID, for example the SUPI, and retrieves the $K_{AUSF}$ from memory. Using the KSI, the AUSF verifies that it has retrieved the correct key. Then, the AUSF will verify the MAC using the calculation for the MAC given above and if it matches, the AUSF has identified the UE and can proceed. It will now derive the $K_{AKMA}$ and forward it to the AAuF. Optionally, the message could also contain a RAND, RES and MAC so that the UE can be authenticated by the AAuF.

As an alternative, AUSF could also take the KSI from the UE message and look up the $K_{AUSF}$ using the KSI. The latter would be advantageous because the UE ID would not have to be contained in the message and the only the KSI, which changes for each authentication run, can be used as a temporary UE identifier. Another advantage of using the KSI is that it is only known to the UE and the AUSF (if it is calculated by both) and can therefore function as an authentication token towards the AUSF, which would mean that the MAC could potentially be omitted from the message. A drawback would be that the KSI will not change until the UE has re-authenticated.

One of the ways to avoid the latter is to include a counter in the KSI. In this case, the counter can be increased for every time that the KSI is successfully used to identify a UE and a new KSI would be calculated. This would require storage of the counter at both the UE side and the AUSF side and setting the counter back to 0 whenever a new authentication run is required. A possible drawback is that the KSIs of multiple UEs could collide. This chance can be further lowered by including the count value in the service request message in FIG. 5, and forwarding this counter in the key request message in FIG. 6. If the combination of counter and KSI is also not unique, the AUSF would have to send an error back and a full authentication between the UE and the AAuF would be required.

A prerequisite for the previous paragraphs is that the AUSF and UE store the $K_{AUSF}$ after authentication has completed. In addition, it is required that the AUSF stores the $K_{AUSF}$ together with either the UE ID or the KSI or both. Also, the AUSF would have to calculate the KSI after UE authentication is completed.

As yet another alternative, the UE message could omit the KSI. In such a case, the AUSF cannot verify whether the key is the correct one. It can only verify the MAC of the message. The advantage of this approach is that no additional storage is required, but also that no calculation of the KSI is required at the side of the UE. As yet another alternative, only the UE ID could be included in the message. In such a case, the AUSF would respond with a RAND, RES and MAC to authenticate the UE and only provide the key to the AAuF after successful authentication. The authentication is required because the AUSF cannot verify the identity of the UE without the KSI or MAC and therefore might hand out the key to the wrong party.

The key that the AUSF hands over to the AAuF can be either the $K_{AUSF}$ or a derivative thereof. Handing over the $K_{AUSF}$ has the disadvantage that the entire key hierarchy follows from $K_{AUSF}$ and that the AAuF therefore obtains access to all the secured communication. Handing over a derivative of the $K_{AUSF}$ means that a further key derivation has to be performed and that the AUSF has to be upgraded to be able to do this key derivation. In this embodiment, we assume that both options are possible. One way to derive the AKMA key could be:

$$K_{AKMA} = KDF(K_{AUSF}, \text{"AKMA"}, RAND),$$

where the $K_{AUSF}$ is the key that is the input to the key derivation function, the string "AKMA" is a static string and the RAND is the one that was sent by the AUSF. Instead of a RAND, also a counter could be used. If no key was derived, the following would hold:

$$K_{AKMA} = K_{AUSF}$$

After the AUSF has verified the identity of the UE and has sent the key, the H-AAuF will (in step 3 of FIG. 5) send the next message to the UE. If everything went well, i.e. a key was found and a $K_{AKMA}$ was derived, this message will carry a confirmation for the UE that the H-AAuF has obtained a $K_{AKMA}$ and from which key it was derived. In addition, the message may contain material to authenticate the UE, like a RES, and it may contain material that allows the UE to verify the correctness of the key, such as a MAC. The MAC would be calculated using the new key so that UE can verify that the AAuF and the UE have the same key, for example, another MAC based on a KDF could be used:

$$MAC = KDF(K_{AKMA}, MSG).$$

Alternatively, a MAC could be included from the AUSF, so that the UE knows that the message came from the AUSF and no attacker is pretending to be the AAuF. Such a MAC could be calculated over the RAND and the $K_{AUSF}$ and other values.

$$MAC = KDF(K_{AUSF}, RAND, Values).$$

Also, both MACs could be included in the message.

Alternatively, signaling keys could be derived from $K_{AKMA}$ which could be used for either encryption and/or integrity protection for signaling between the UE and the AAuF.

When the UE receives the message in step 4 of FIG. 5, it will derive the same keys in the same way, verify the integrity of the message (verify the all the MACs in the message if more than one was included) and, if necessary, respond to the authentication challenge. Now, the UE and the H-AAuF share the same $K_{AKMA}$ based on the same root key.

In some cases, the AUSF may not have or may not be able to provide the requested key. Those are the error cases in FIG. 6. In order to resolve this, there are two options:

The AUSF sends an authentication request message to the UDM to initiate an authentication as specified in TS 33.501. This involves a round trip of messages between the AUSF and the UE and once the UE is authenticated, a key can be shared with the AAuF.

The AUSF signals an error to the AAuF. In response to the error, the AAuF sends an authentication request message to the UDM and, after obtaining the authentication vector, runs an authentication with the UE. Once the authentication is complete, the UE and the AAuF share a key which can be used for the AKMA service.

Example 1

Referring to the above figures, the steps are as follows. In the first step of FIG. 5, the UE sends, to the H-AAuF, a service request setting the flag to "AUSF". The UE also includes its SUPI, $KSI_{AUSF}$, and the MAC in the message. In the second step, the H-AAuF receives the message. The AAuF checks whether the UE is roaming or not, it checks whether the roaming partner allows the usage of home network key or not, and it checks whether the UE is allowed to use the service or not. If the service is not allowed, the AAuF will stop here. If the UE is non-roaming and home network key is allowed or if the UE is roaming and the home network key is allowed, the H-AAuF proceeds and sends the message to the AUSF. The AUSF retrieves the $K_{AUSF}$, checks the KSI, verifies the MAC on the message, and if everything is fine, calculates $K_{AKMA}$ from $K_{AUSF}$ and a fresh random value RAND. The AUSF forwards $K_{AKMA}$ and a RAND to the H-AAuF in a confirmation message. The H-AAuF creates a response message indicating that a key was derived from $K_{AUSF}$, adds the RAND, signs the response message using the newly obtained key or a signaling derivative thereof and sends it to the UE. The UE calculates the $K_{AKMA}$ using the RAND and the $K_{AUSF}$, verifies the message and sends a confirmation message saying that the key was derived fine. The UE protects the confirmation message with the same key as the H-AAuF did.

Example 2

Referring to the above figures, the steps are as follows. In the first step of FIG. 5, the UE sends, to the H-AAuF, a service request setting the flag to "SEAF". The UE also includes its SUPI, $KSI_{SEAF}$, and the MAC in the message. In the second step, the H-AAuF receives the message. The AAuF checks whether the UE is roaming or not, it checks whether the roaming partner allows the usage of home network key or not, whether the home network allows usage of $K_{SEAF}$ for AKMA, and it checks whether the UE is allowed to use the service or not. If the service is not allowed, the AAuF will stop here. If the UE is non-roaming and $K_{SEAF}$ is allowed by the home network or if the UE is roaming and the $K_{SEAF}$ is allowed, the H-AAuF proceeds and sends the message to the AUSF. The AUSF retrieves the $K_{AUSF}$, checks the KSI, verifies the MAC on the message, and if everything is fine, first calculates $K_{SEAF}$ from $K_{AUSF}$ and then $K_{AKMA}$ from $K_{SEAF}$ and a fresh random value RAND. The AUSF forwards $K_{AKMA}$ and a RAND to the H-AAuF in a confirmation message. The H-AAuF creates a response message indicating that a key was derived from $K_{SEAF}$, adds the RAND, signs the response message using the newly obtained key or a signaling derivative thereof and sends it to the UE. The UE calculates the $K_{AKMA}$ using the RAND and the $K_{SEAF}$, verifies the message and sends a confirmation message saying that the key was derived fine. The UE protects the confirmation message with the same key as the H-AAuF did.

Example 3

Referring to the above figures, the steps are as follows. In the first step of FIG. 5, the UE sends, to the H-AAuF, a service request setting the flag to "AUSF". The UE also includes its SUPI, $KSI_{AUSF}$, and the MAC in the message. In the second step, the H-AAuF receives the message. The AAuF checks whether the UE is roaming or not, it checks whether the roaming partner allows the usage of home network key or not, it checks whether the home network allows usage of $K_{SEAF}$ for AKMA, and it checks whether the UE is allowed to use the service or not. In this example, the UE is roaming and the roaming partner does not allow the usage of $K_{AUSF}$ as a root for $K_{AKMA}$. The H-AAuF proceeds and sends, to the AUSF, the message including an indicator that the roaming partner does not allow the usage of $K_{AUSF}$. The AUSF retrieves the $K_{AUSF}$, checks the KSI, verifies the MAC on the message, and if everything is fine, first calculates $K_{SEAF}$ from $K_{AUSF}$ and then $K_{AKMA}$ from $K_{SEAF}$ and a fresh random value RAND. The AUSF forwards $K_{AKMA}$ and a RAND to the H-AAuF in a confirmation message. The H-AAuF creates a response message indicating that a key was derived from $K_{SEAF}$, adds the RAND, signs the response message using the newly obtained key or a signaling derivative thereof and sends it to the UE. The UE calculates the $K_{AKMA}$ using the RAND and the $K_{SEAF}$, verifies the message and sends a confirmation message saying that the key was derived fine. The UE protects the confirmation message with the same key as the H-AAuF did.

Key Hierarchy Options

Figure 7:
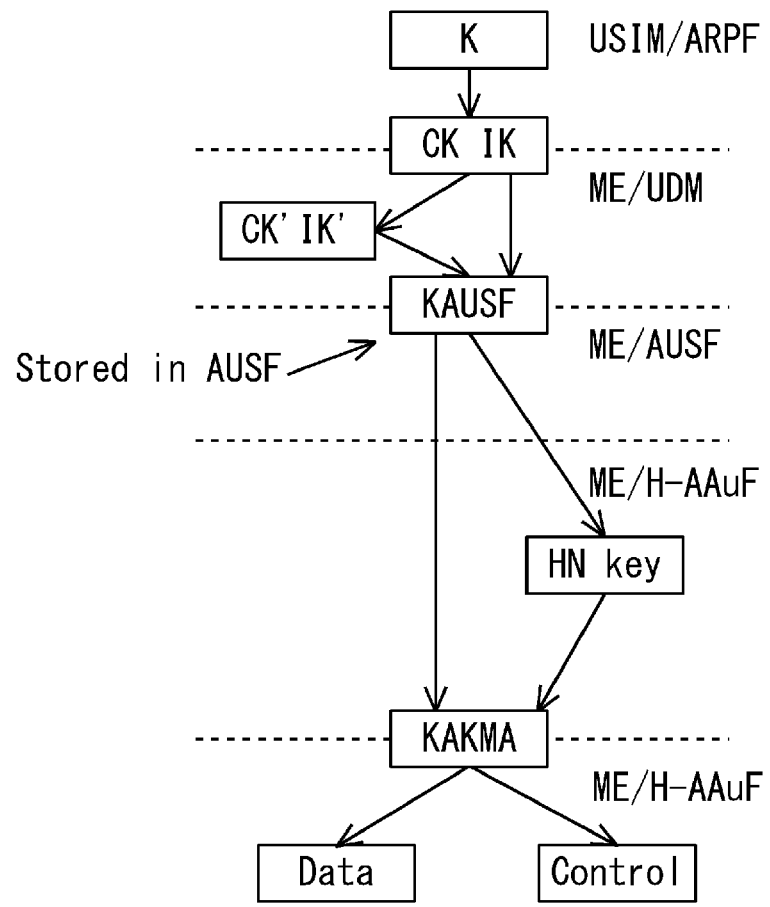
FIG. 7 illustrates a key hierarchy for using $K_{AKMA}$ based on home network key in accordance with the present disclosure.

FIG. 7 shows an exemplary key hierarchy for the case where the UE requests a key based on $K_{AUSF}$ and is allowed to use such a key (example 1). The keys in the key hierarchy are the following:

K: This is the secret key shared between the UE and the network. This key is stored on the mobile device and in a subscriber database on the network side. In the case of 5G, this key is stored in the USIM on the UE side and in the ARPF (Authentication credential Repository and Processing Function) on the network side. In 4G, 3G, and 2G the network side storage is called AuC which is part of the HSS/HLR respectively.

CK, IK: This is a set of keys that are derived by the USIM and the network node after authentication. In 5G, these keys are derived inside the ARPF and sent to the UDM. In 4G, these keys inside the HSS and, in 3G, these keys are the keys used for integrity and confidentiality protection of the data on the user and signaling plane between the UE and the network. They are also known as the UMTS keys. In 4G and 5G, these keys are temporary, i.e. not stored for later usage and deleted from memory after they have been used.

CK' and IK': If EAP AKA' is used, these intermediate keys are derived from CK and IK as well. In 5G, these keys are used for deriving the $K_{AUSF}$. There is no equivalent of $K_{AUSF}$ in 2G, 3G or 4G. In 4G and 5G, these keys are temporary.

$K_{AUSF}$: this key is derived from CK and IK or from CK' and IK' and resides in the AUSF. In 5G security architecture, the AUSF derives the subsequent key $K_{SEAF}$ which is sent to the serving network. In this key hierarchy, this key and the above (apart from K) are the result of a successful authentication and key agreement run in the UE and the network.

HN Key: This key is not part of the existing key hierarchy. In this document, it is a key derived from $K_{AUSF}$ by the AUSF for usage by the H-AAuF. The HN key resides in the H-AAuF. Compared to earlier text, there was no mentioning of a HN key. The reason to introduce it in the key hierarchy is that it allows for some more flexibility in the system. For example, one way to utilize this key is that the AUSF will push the key to the AAuF directly after authentication. This way, the AUSF would not need to keep the $K_{AUSF}$ and design can be easier. Another advantageous approach could be that the AAuF fetches this key during the first time that the service is used and then only fetches a new key when the AAuF has lost the key or the UE has signaled that it would like to terminate the service. In any case, if it is used, the $K_{AKMA}$ can be derived from the HN Key.

The $K_{AKMA}$ is the key that is used for the AKMA service. It can be derived directly from $K_{AUSF}$ or from a newly introduced HN Key. The $K_{AKMA}$ can also serve as a root key for AKMA. In that case, one or more separate control keys would be derived to protect the signaling for AKMA between the AAuF and the UE and application specific keys would be derived for data transport.

In case the UE indicates the usage of $K_{AUSF}$ as the basis for $K_{AKMA}$, the key hierarchy and the key derivations are according to FIG. 7.

In some cases, the AUSF may have lost the key. In such cases, the key hierarchy in 7 can still be obtained by running an authentication between the UE and the AUSF (with the AAuF as pass through as explained in the prior art). In such a case, all the keys (optionally skipping CK' and IK') in the key hierarchy will be established just for the AKMA service.

Figure 8:
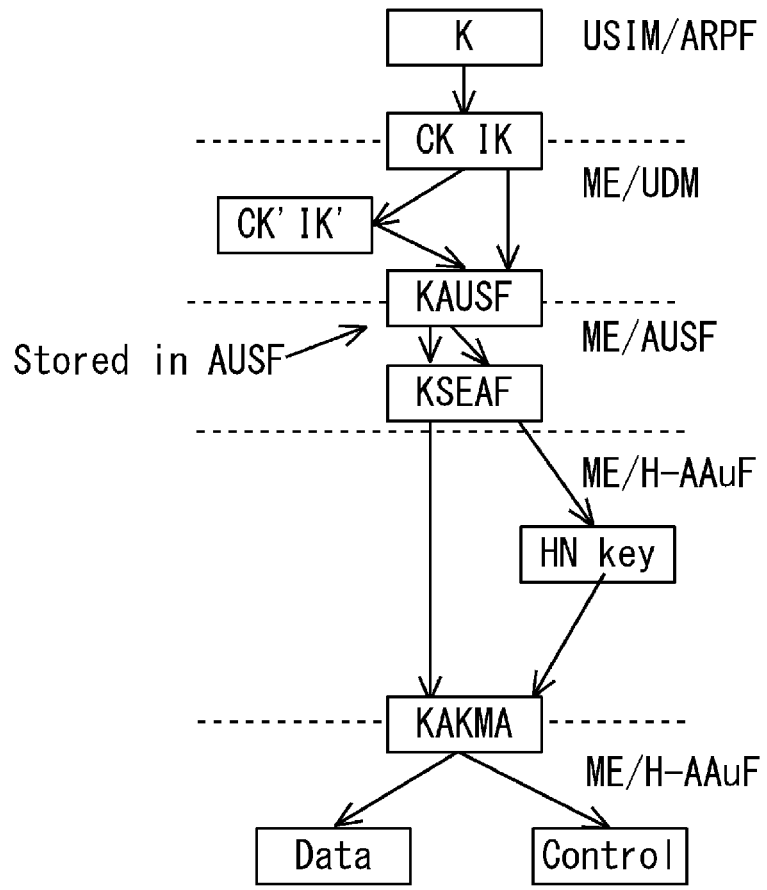
FIG. 8 illustrates a key hierarchy when using $K_{AKMA}$ from $K_{SEAF}$ and H-AAuF in accordance with the present disclosure.

FIG. 8 shows the key hierarchy in case the $K_{AKMA}$ is derived from $K_{SEAF}$ in the case of an H-AAuF presence (example 2 and example 3). The keys in this key hierarchy are the same, apart from the following:

$K_{SEAF}$: This key is the result of a 5G authentication run and is sent to the SEAF in the serving network by the AUSF. This key is derived from the $K_{AUSF}$ by the AUSF.

HN Key: Contrary to FIG. 7, this key is now derived from $K_{SEAF}$ or equal to $K_{SEAF}$ if no new derivation is required.

$K_{AKMA}$: This key is now derived from HN Key or $K_{SEAF}$.

The presence of the $K_{SEAF}$ in the key hierarchy indicates that the HN key or the $K_{AKMA}$ are derived from $K_{AUSF}$ via $K_{SEAF}$. Said differently, $K_{SEAF}$ is first derived by the AUSF before $K_{AKMA}$ is derived.

Figure 9:
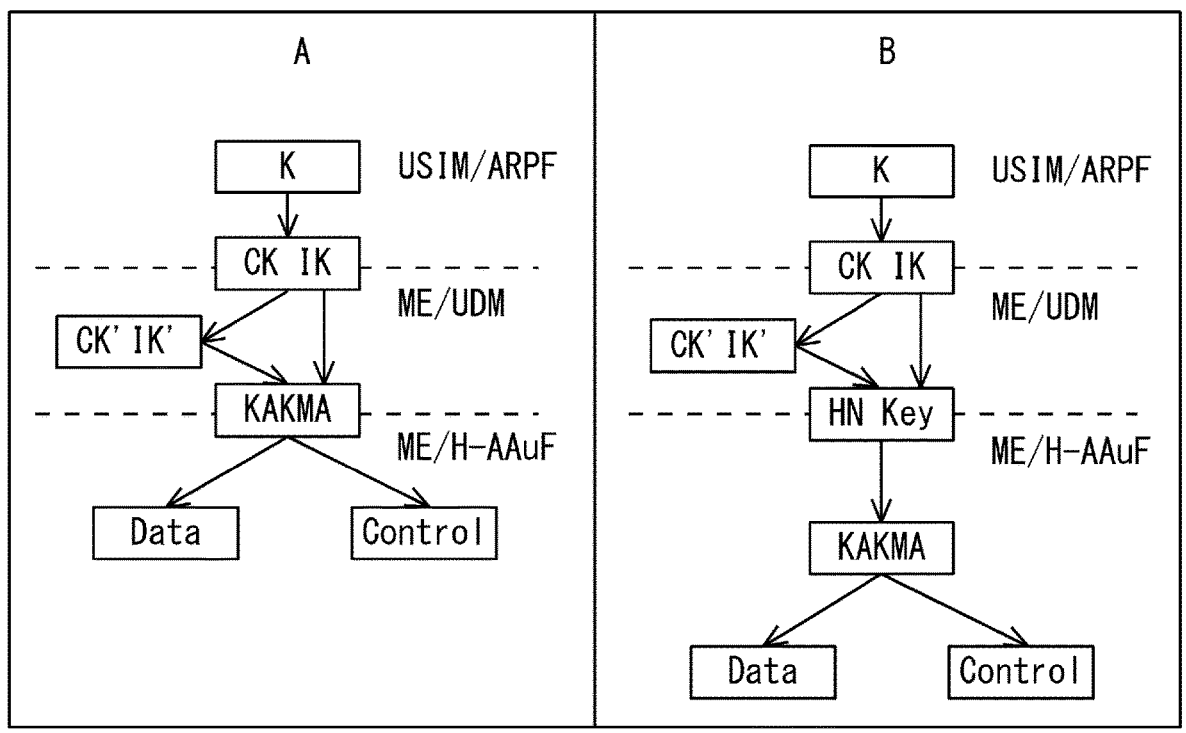
FIG. 9 illustrates key hierarchies when using new authentication in accordance with the present disclosure.

FIG. 9 shows the key hierarchies in case errors have occurred in the AUSF or if the H-AAuF is not connected to the AUSF. In such a case, a new authentication run will be required and the keys can be derived as shown in Fig. A and Fig. B. In figures A and B, $K_{AKMA}$ and HN Key respective take the place of the $K_{AUSF}$ in the key hierarchy. The difference between the two figures is that a separate key, HN key, is derived which is kept in the H-AAuF and is used for further derivations of the AMKA key.

With respect to the key derivations, it should be noted that $K_{AUSF}$ is normally network dependent. In order to do so, the AUSF sends the serving network ID to the UDM, which then derives the key.

In case of 5G AKA: $K_{AUSF}$=KDF(Input key, Serving network name, SQN XOR AK), where the input key is the concatenation of CK and IK.

In case of EAP AKA': CK' IK'=KDF(Input key, serving network name, SQN XOR AK), where the input key is the concatenation of CK and IK. $K_{AUSF}$ is subsequently derived from CK' and IK'.

In the case of AKMA, however, the value of the serving network name should be set as well. In 5G, the serving network name is "5G:MCC MNC", where the MCC is the mobile country code and the MNC is the mobile network code. For AKMA, there are several options for the serving network name input:

"AKMA", in which case the key is specific for AKMA, but not specific whether it is for an H-AAuF or a V-AAuF or a specific network.

"AKMA: MCC MNC", in which case the key could be made specific for AKMA and a specific network. The choice of MCC MNC could then depend on which serving network the UE is attached to or the serving network to which the AAuF belongs to. So in case the H-AAuF contacts the UDM, it will provide the home network MCC and MNC to the UDM to use for the key derivation. If the V-AAuF contacts the UDM (see embodiment 2), it would provide the MNC MCC of its network and if the V-AAuF has contacted the H-AAuF which in turn asked the UDM, either of the MNC MCC of the V-AAuF could be used. The advantage of such an approach is that it is possible to create multiple AKMA security contexts, for example one specific to the serving network that the UE is in and one specific for the home network of the network. The advantage would be that if some services would only be available in the home network, those services could be protected between the UE and the H-AAuF whereas services available in the visited network could use the visited network security context.

Alternatively, the UDM could provide the CK and IK or the CK' and IK' directly to the AAuF which in turn could derive the AKMA keys.

Second Embodiment

Figure 10:
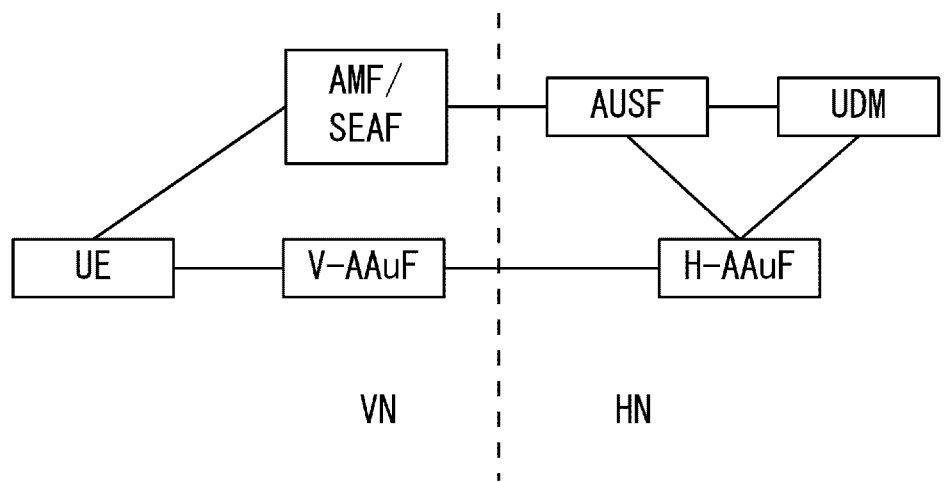
FIG. 10 illustrates architecture option with AAuF both in the home network and the visited network in accordance with the present disclosure.

FIG. 10 shows an architecture where the AAuF resides in the home network and the visited network.

The architecture in FIG. 10 shows a simplified, but generic architecture for 5G. In the serving network (denoted with SN), the network functions AMF and SEAF are displayed. Like in FIG. 4, the UE is connected to the serving network, which is indicated by the line between the UE and the AMF. This line is representative of the NAS connection and NAS security context that the UE has with the AMF. In this architecture, the SEAF is shown as collocated with the AMF, however the same function could also be standalone in the future. The lines in the figure indicate that the respective elements are connected through wired, wireless, optical, etc. communication means. The connections can also be logical such as for example the line between the UE and the AMF.

The AMF/SEAF is communicatively connected to the AUSF. This line indicates that the AMF/SEAF can obtain key material from the AUSF for example to authenticate the UE when it attaches to the serving network. The AUSF resides in the home network, however, it is also possible that in the future parts of the AUSF functionality may reside in the serving or visited network. The AUSF is connected to the UDM in order to fetch authentication data from the UDM when the UE needs to be authenticated.

In FIG. 10, the UE is also connected to the AAuF in the serving or visited network (denoted by V-AAuF). The V-AAuF is shown to be communicatively connected to the AMF/SEAF and a H-AAuF in the home network. From FIG. 1, it becomes apparent that the V-AAuF may also be connected to UDM or AUSF. In this embodiment, however, we assume that the V-AAuF is connected to the H-AAuF which takes care of the communication to the UDM and AUSF. In the case that a H-AAuF is missing, the V-AAuF could take the role of the H-AAuF if allowed by the home network.

The lines in FIG. 10 can also be indicative of service based interfaces in an architecture as shown in FIG. 4.

Figure 11:
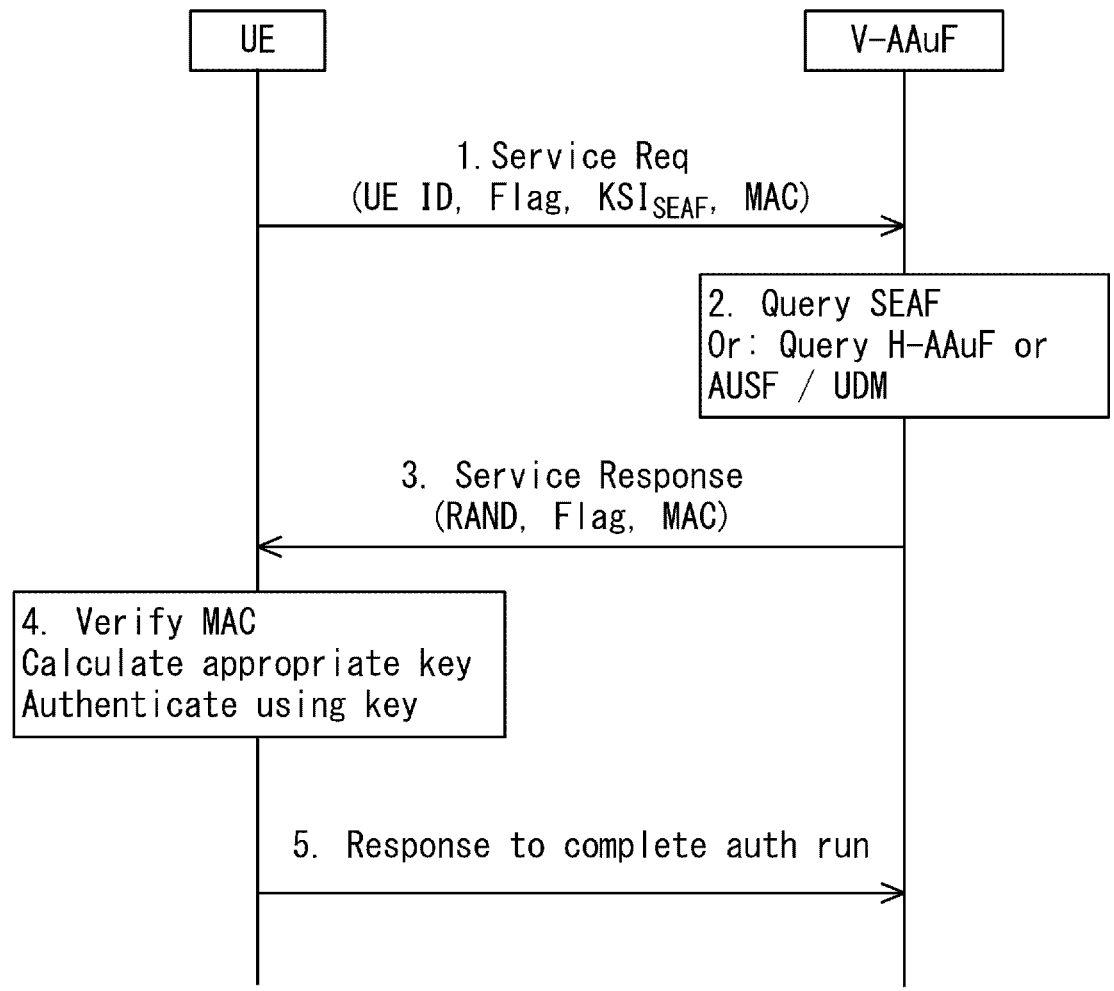
FIG. 11 shows a message exchange between the UE and the V-AAuF in accordance with the present disclosure.

FIG. 11 shows an exemplary exchange of messages between the UE and the V-AAuF. As described with FIG. 5, it is assumed that the UE is connected to a network and that authentication and key agreement between the serving network and the UE may have taken place. If this authentication and key agreement has taken place on a 5G network as specified in TS 33.501, the serving network has obtained the $K_{SEAF}$, $K_{AMF}$ and keys lower in the hierarchy, and the home network has calculated CK, IK and $K_{AUSF}$. If the authentication was done on other network, such as LTE, UMTS, GSM, etc., the key hierarchy is different and different keys will have been obtained by the different nodes in such a network. For clarity, this document assumes that authentication has taken place on a 5G network.

In step 1, the UE sends a message to request for service to the V-AAuF. The service request message contains an identifier of the UE, a flag for whether the UE would like to use a home network key or a serving network key, a key set identifier (KSI) and optionally a MAC that is calculated using one of the keys resulting from an earlier authentication to the network, such as for example $K_{AUSF}$ or $K_{SEAF}$ in the case of 5G.

The UE identifier in the service request message can be the permanent identifier SUPI or IMSI, a temporary identifier 5G-GUTI or an encrypted version of the identifier such as SUCI as defined in TS 33.501. The identifier can also be an MSISDN, SIP address, email address, etc. as long as the V-AAuF or the H-AAuF can relate the identifier to a subscriber and recover the appropriate identifier for the service.

The flag is as described in embodiment 1. The KSI is also described in embodiment 1. In the case of referring to $K_{SEAF}$, the UE can now also use eKSI because the AMF/SEAF has already stored that value after authentication. Note that the eKSI is only available in the serving network and not in the home network. The MAC that is included in the message is described in embodiment 1. In this embodiment, however, the UE uses $K_{SEAF}$ because it sends the message to the V-AAuF which requests key material from the SEAF. As such, the SEAF can verify the message. The counter is kept at the AAuF or SEAF and at the UE. Note that separate counters would have to be kept for each network element or at least one for the home network and one for the visited network.

Figure 12:
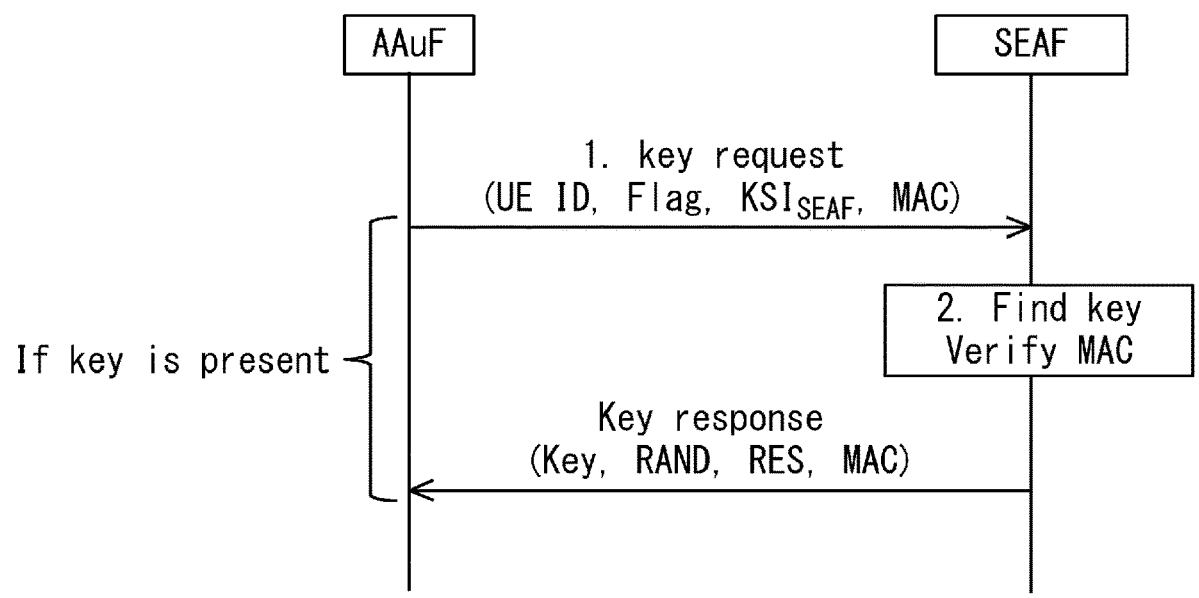
FIG. 12 illustrates a process of key retrieval from the AUSF in accordance with the present disclosure.

In step 2 of FIG. 11, the V-AAuF receives the message. If the UE has requested a key based on $K_{SEAF}$, the AAuF will send, to the SEAF, a message asking for the key as is shown in FIG. 12. The SEAF will first try to find the key ($K_{SEAF}$ in this embodiment), then verify the MAC and subsequently respond with the appropriate key and optionally with a challenge and response. The response from the SEAF may also contain a MAC so that the UE can verify authenticity of the SEAF.

The verification of the UE message at the SEAF works as follows. First, the SEAF takes the UE ID, for example the SUPI, and retrieves the $K_{SEAF}$ from memory. Using the KSI, the AUSF verifies that it has retrieved the correct key. Then, the SEAF will verify the MAC using the calculation for the MAC given above and if it matches, the SEAF has identified the UE and can proceed. It will now derive the $K_{AKMA}$ and forward it to the AAuF. Optionally, the message could also contain a RAND, RES and MAC so that the UE can be authenticated by the AAuF.

As an alternative, SEAF could also take the KSI from the UE message and look up the $K_{AUSF}$ using the KSI if a KSI is calculated. If the KSI was set equal to the eKSI, this is not possible because the eKSI is too short to be able to identify the UE.

As yet another alternative, the UE message could omit the KSI. In such a case, the SEAF cannot verify whether the key is the correct one. It can only verify the MAC of the message. The advantage of this approach is that no additional storage is required, but also that no calculation of the KSI is required at the side of the UE. As yet another alternative, only the UE ID could be included in the message. In such a case, the SEAF would respond with a RAND, RES and MAC to authenticate the UE and only provide the key to the AAuF after successful authentication. The authentication is required because the SEAF cannot verify the identity of the UE without the KSI or MAC and therefore might hand out the key to the wrong party. Also here, a counter could be included in the KSI.

The calculation of $K_{AKMA}$ can be done directly from $K_{SEAF}$ using a key derivation function and a number of other parameters.

After the AUSF has verified the identity of the UE and has sent the key, the V-AAuF will (in step 3 of FIG. 11) send the next message to the UE. If everything went well, i.e. a key was found and a $K_{AKMA}$ was derived, this message will carry a confirmation for the UE that the V-AAuF has obtained a $K_{AKMA}$ and from which key it was derived. In addition, the message may contain material to authenticate the UE, like a RES, and it may contain material that allows the UE to verify the correctness of the key, such as a MAC. The MAC would be calculated using the new key so that UE can verify that the AAuF and the UE have the same key, for example, another MAC based on a KDF could be used:

$$MAC = KDF(K_{AKMA}, MSG)$$

Alternatively, signaling keys could be derived from $K_{AKMA}$ which could be used for either encryption and/or integrity protection for signaling between the UE and the AAuF.

When the UE receives the message in step 4 of FIG. 11, it will derive the same keys in the same way, verify the integrity of the message and, if necessary, respond to the authentication challenge. Now, the UE and the V-AAuF share the same $K_{AKMA}$ based on the same root key.

Example 1

Referring to the above figures, the steps are as follows. In the first step of FIG. 11, the UE sends, to the V-AAuF, a service request setting the flag to "SEAF". The UE also includes its SUPI, $KSI_{SEAF}$ or eKSI, and the MAC in the message. In the second step, the V-AAuF receives the message. The V-AAuF checks whether the UE is allowed to use the service or not. If the service is not allowed, the V-AAuF will stop here. Otherwise, the V-AAuF proceeds and sends the message to the SEAF. The SEAF retrieves the $K_{SEAF}$, checks the KSI, verifies the MAC on the message, and if everything is fine, calculates $K_{AKMA}$ from $K_{SEAF}$ and a fresh random value RAND. The SEAF forwards $K_{AKMA}$ and a RAND to the V-AAuF in a confirmation message. The V-AAuF creates a response message indicating that a key was derived from $K_{SEAF}$, adds the RAND, signs the response message using the newly obtained key or a signalling derivative thereof and sends it to the UE. The UE calculates the $K_{AKMA}$ using the RAND and the $K_{SEAF}$, verifies the message and sends a confirmation message saying that the key was derived fine. The UE protects the confirmation message with the same key as the V-AAuF did.

In case the $K_{SEAF}$ is not available in the SEAF anymore, an additional step will be necessary to retrieve the $K_{SEAF}$ again. One way to obtain this step is to send, from the V-AAuF to the AUSF, a message asking for a $K_{AKMA}$ derived from $K_{SEAF}$. The AUSF would then derive first $K_{SEAF}$ and subsequently $K_{AKMA}$ and return this to the V-AAuF. Alternatively, the AUSF could directly provide the $K_{SEAF}$ to V-AAuF which then could do the calculation. Yet another alternative is that the V-AAuF could ask the H-AAuF to provide a $K_{SEAF}$ or provide a $K_{AKMA}$ based on $K_{SEAF}$.

Example 2

Referring to the above figures, the steps are as follows. In the first step of FIG. 11, the UE sends, to the V-AAuF, a service request setting the flag to "AUSF". The UE also includes its SUPI, $KSI_{AUSF}$, and the MAC in the message. In the second step, the V-AAuF receives the message. The V-AAuF checks whether the UE is roaming or not, it checks whether the roaming partner (i.e. itself) allows the usage of home network key or not and it checks whether the UE is allowed to use the service or not. If the service is not allowed, the V-AAuF will stop here. If the UE is roaming and the $K_{AUSF}$ is allowed by the visited operator, the V-AAuF proceeds and sends the message to the AUSF. The AUSF retrieves the $K_{AUSF}$, checks the KSI, verifies the MAC on the message, and if everything is fine, first calculates $K_{AKMA}$ from $K_{AUSF}$ and a fresh random value RAND. The AUSF forwards $K_{AKMA}$ and a RAND to the V-AAuF in a confirmation message. The V-AAuF creates a response message indicating that a key was derived from $K_{AUSF}$, adds the RAND, signs the response message using the newly obtained key or a signaling derivative thereof and sends it to the UE. The UE calculates the $K_{AKMA}$ using the RAND and the $K_{AUSF}$, verifies the message and sends a confirmation message saying that the key was derived fine. The UE protects the confirmation message with the same key as the V-AAuF did.

Example 3

Referring to the above figures, the steps are as follows. In the first step of FIG. 11, the UE sends, to the V-AAuF, a service request setting the flag to "AUSF". The UE also includes its SUPI, $KSI_{AUSF}$, and the MAC in the message. In the second step, the V-AAuF receives the message. The V-AAuF checks whether the UE is roaming or not, it checks whether the roaming partner (i.e. itself) allows the usage of home network key or not and it checks whether the UE is allowed to use the service or not. If the service is not allowed, the V-AAuF will stop here. If the UE is roaming and the $K_{AUSF}$ is allowed by the visited operator, the V-AAuF sends the message to the H-AAuF, which in turn checks whether the usage of the $K_{AUSF}$ is allowed. If so, H-AAuF proceeds and sends the message to the AUSF. The AUSF retrieves the $K_{AUSF}$, checks the KSI, verifies the MAC on the message, and if everything is fine, first calculates $K_{AKMA}$ from $K_{AUSF}$ and a fresh random value RAND. The AUSF forwards $K_{AKMA}$ and a RAND to the H-AAuF in a confirmation message. The H-AAuF creates a response message indicating that a key was derived from $K_{AUSF}$, adds the RAND, signs the response message using the newly obtained key or a signaling derivative thereof and sends it to the V-AAuF, which in turn sends it to the UE. The UE calculates the $K_{AKMA}$ using the RAND and the $K_{AUSF}$, verifies the message and sends a confirmation message saying that the key was derived fine. The UE protects the confirmation message with the same key as the H-AAuF did.

Key Hierarchy Options

Figure 13:
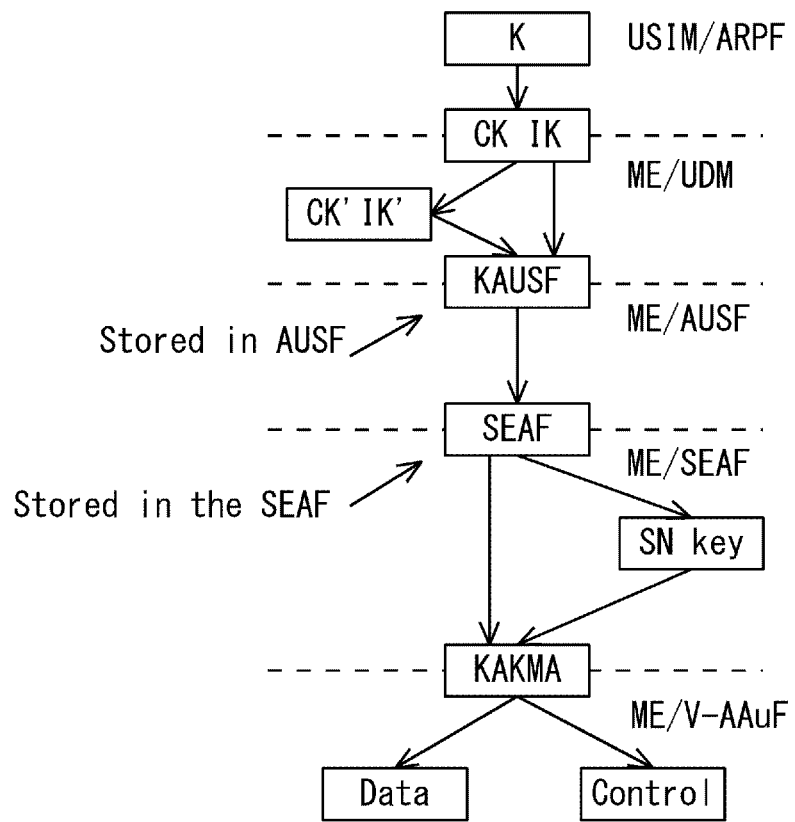
FIG. 13 shows a key hierarchy for using $K_{AKMA}$ based on serving network key in accordance with the present disclosure.

FIG. 13 shows an exemplary key hierarchy for the case where the UE requests a key based of $K_{SEAF}$. The keys are the same as in FIG. 7, only differences are:

$K_{SEAF}$: this key is derived from $K_{AUSF}$ by the AUSF and sent to SEAF as part of the 5G authentication procedure. This key may be stored in the SEAF. In this key hierarchy, this key and the above keys (apart from K) are the result of a successful authentication and key agreement run in the UE and the network.

SN Key: This key is not part of the existing key hierarchy. The SN key resides in the V-AAuF and has a similar role to the key HN in the Home Network. In this case, the SEAF could push the key to the V-AAuF after authentication so that no key need to be stored in the SEAF or that the V-AAuF only needs to fetch it once from the SEAF. In any case, if it is used, the $K_{AKMA}$ can be derived from the SN Key.

The $K_{AKMA}$ is the key that is used for the AKMA service. It can be derived directly from $K_{SEAF}$ or from a newly introduced SN Key. The $K_{AKMA}$ can also serve as a root key for AKMA. In that case, one or more separate control keys would be derived to protect the signaling for AKMA between the AAuF and the UE and application specific keys would be derived for data transport.

In case the UE indicates the usage of $K_{AUSF}$ as the basis for $K_{AKMA}$, the key hierarchy and the key derivations are according to FIG. 13.

In some cases, the SEAF may have lost the key. In such cases, the key hierarchy in FIG. 14 can be used. This case explains the case where the V-AAuF asks the H-AAuF for a key. In example 1, it was said that the H-AAuF could obtain a $K_{SEAF}$, which in this key hierarchy is abstracted to HN Key because it is obtained in the home network by the H-AAuF. The H-AAuF in this case obtains a HN Key from the AUSF. Next, it could derive a SN Key from this key or forward the HN Key as SN Key to the V-AAuF, which can then derive the $K_{AKMA}$ key as it would have obtained the $K_{SEAF}$. In this case there would be no need to signal back, to the UE, that a different key derivation is to be used.

Figure 15:
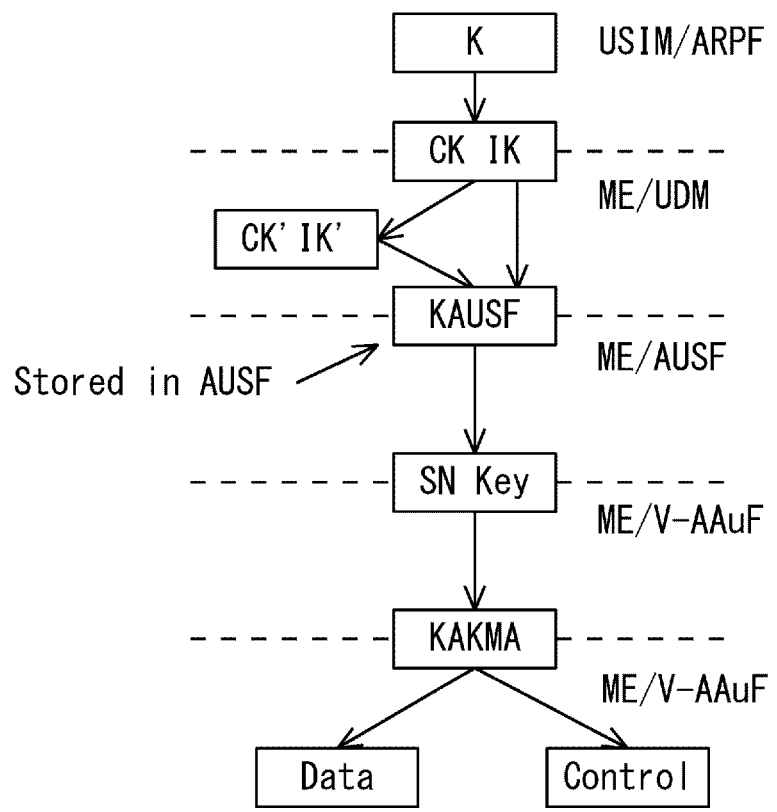
FIG. 15 shows a key hierarchy when using $K_{AKMA}$ from $K_{SEAF}$ and H-AAuF in accordance with the present disclosure.

Example 2 leads to a key hierarchy displayed in FIG. 15, where the SN Key is equal to $K_{AKMA}$ (i.e. there is no derivation going from SN Key to $K_{AKMA}$). Similar to previous key hierarchy, there would be advantages by introducing a SN Key, but not strictly necessary as shown by example 1.

Figure 14:
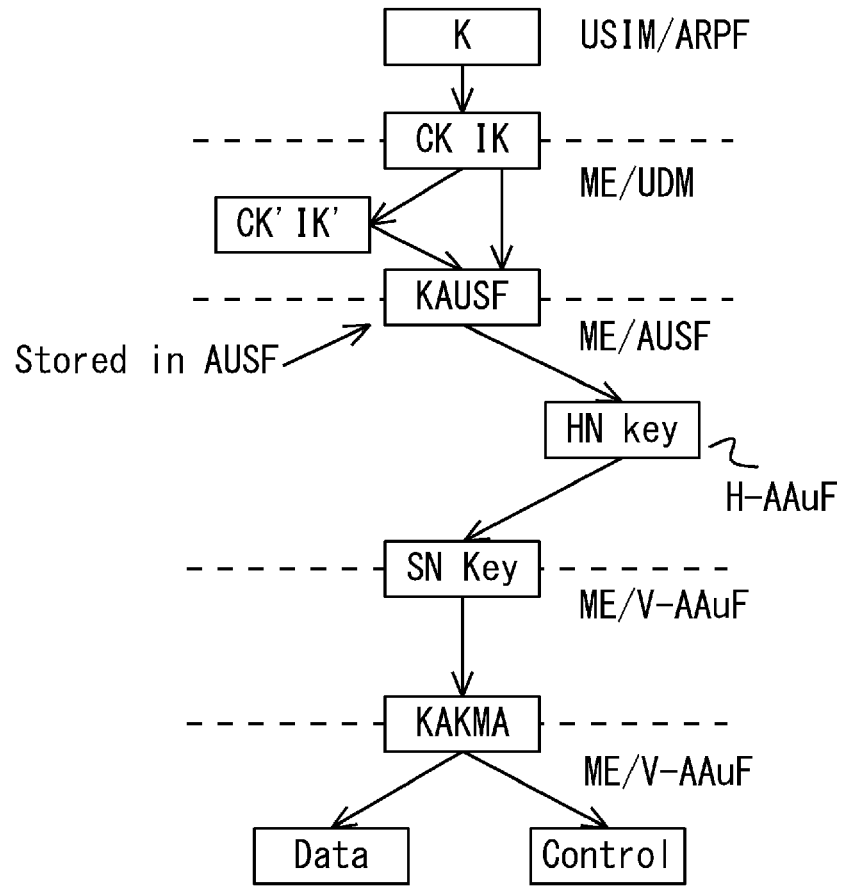
FIG. 14 shows a key hierarchy without presence of $K_{SEAF}$ in accordance with the present disclosure.

Example 3 leads to a hey hierarchy as displayed in FIG. 14 with the HN Key and the SN Key both being equal to $K_{AKMA}$. The alternative as displayed in FIG. 14 could also be obtained by using intermediate keys before derivation $K_{AKMA}$. The advantages of these keys have been described for the previous embodiments.

FIG. 9 (previous embodiment) shows the key hierarchies in case errors have occurred in the AUSF or if the H-AAuF is not connected to the AUSF. Similar cases exist for the V-AAuF for when a key from the SEAF or the AUSF is not available (reasons could be that they lost it or because the V-AAuF is not communicatively connected to these nodes):

In case the V-AAuF is connected to the UDM, a key hierarchy similar to case A or case B of FIG. 9 can be obtained by running an authentication. The differences with respect to FIG. 9A are that the H-AAuF should be replaced with V-AAuF. The differences with respect to FIG. 9B are that the H-AAuF should be replaced with V-AAuF and the HN Key should be replaced with SN Key.

In case the V-AAuF is connected to the H-AAuF, the key hierarchies as described in the previous bullet can be obtained. In addition, a key hierarchy could be obtained where an additional SN Key is derived from the HN Key.

Third Embodiment

In addition to AKMA, another technology called BEST also exists. This embodiment deals with enhancing BEST in such a way that 5G key hierarchy can be used.

Figure 16:
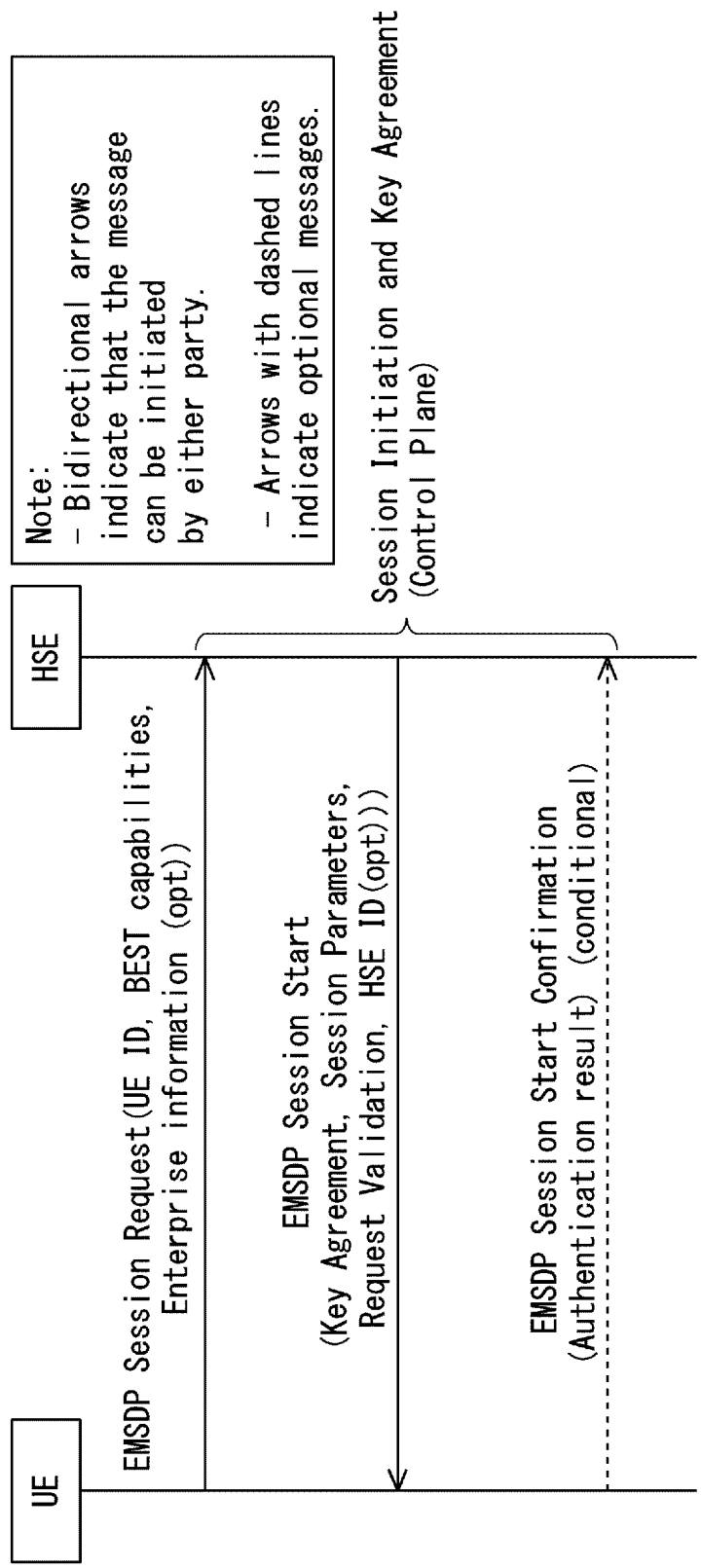
FIG. 16 illustrates an EMSDP Session Setup procedure for BEST technology in accordance with the present disclosure.

FIG. 16 shows an EMSDP Session setup procedure and authentication according to BEST TS 33.163. In this flow, the first step is that UE contacts the HSE with an EMSDP Session Request containing the UE ID, the BEST capabilities, the Enterprise Information. In the second step, the HSE responds with a EMSDP Session Start containing the Key Agreement parameters, the Request Validation, and the HSE ID. The third, and optional step is that the UE confirms the EMDSP Session Start, which is an authentication confirmation message.

In this flow, the HSE and UE authenticate each other leading to new key material, i.e. a new authentication run is required for setting up a BEST session.

Variant 1

Figure 17:
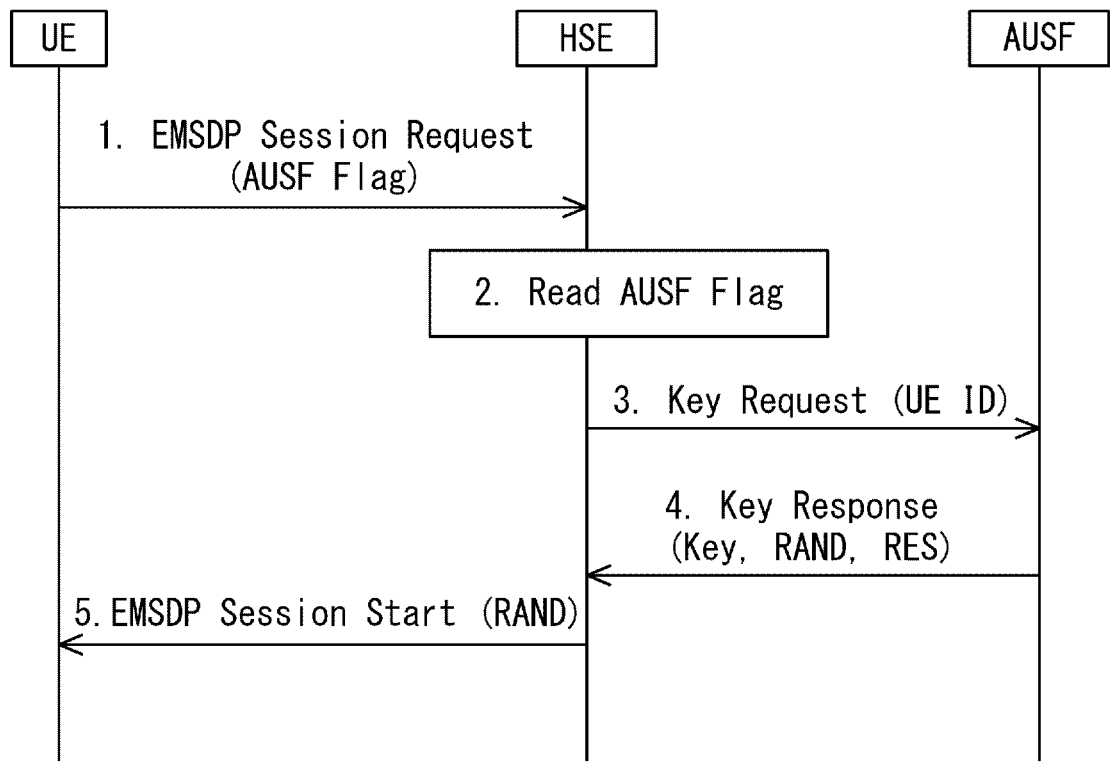
FIG. 17 illustrates an EMSDP Session Setup procedure for BEST technology in accordance with the present disclosure.
Figure 18:
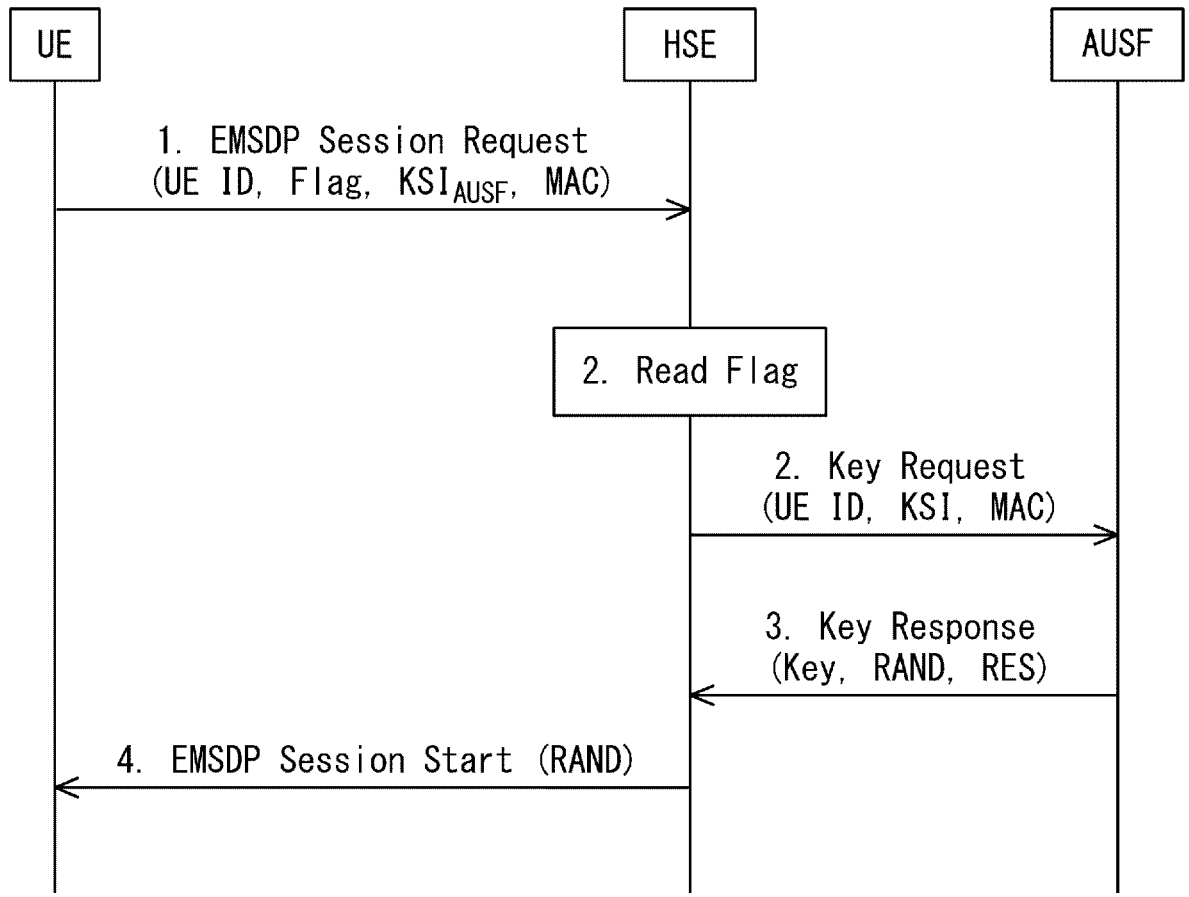
FIG. 18 illustrates an EMSDP Session Setup procedure for BEST technology in accordance with the present disclosure.
Figure 19:
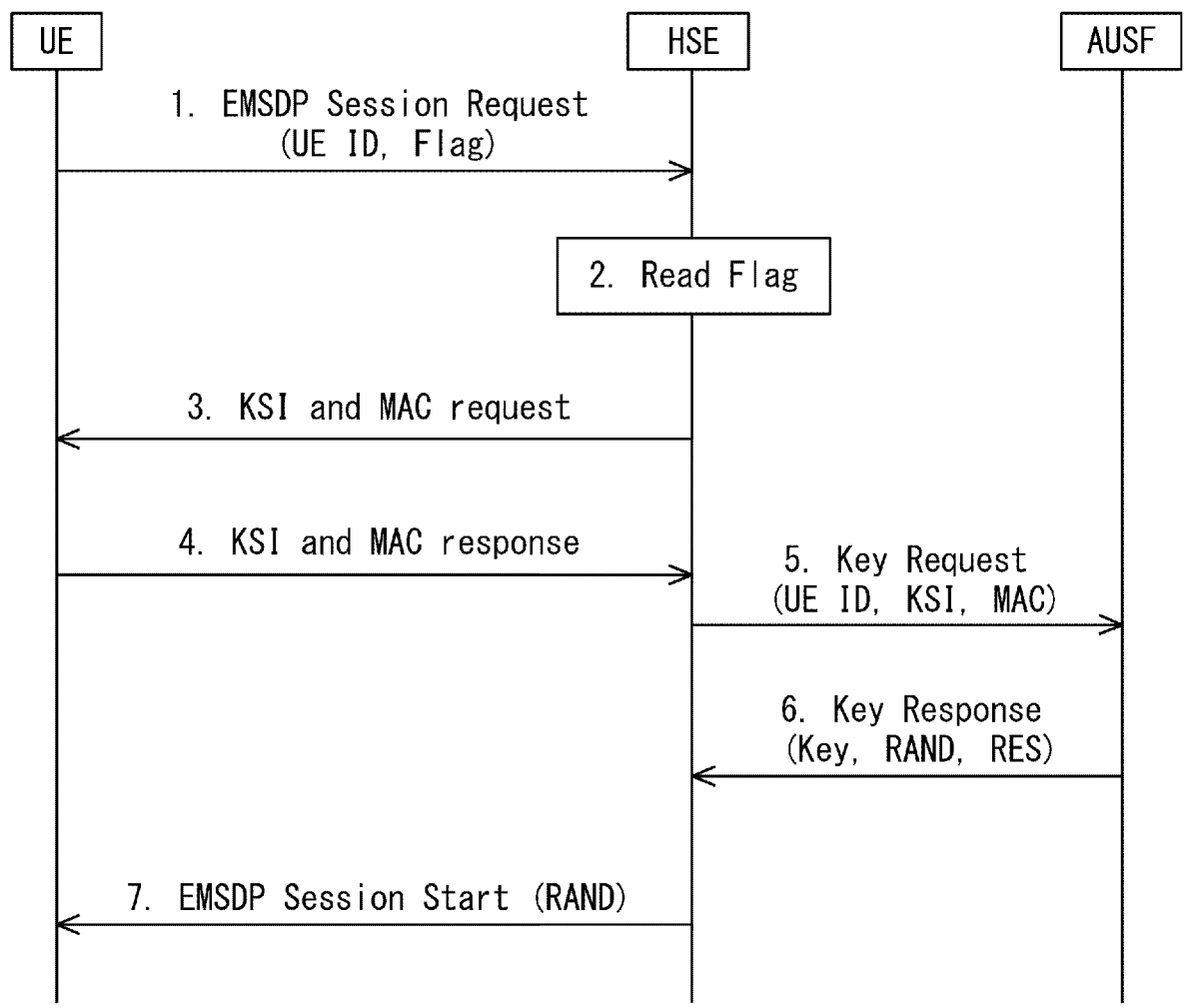
FIG. 19 illustrates an EMSDP Session Setup procedure for BEST technology in accordance with the present disclosure.
Figure 20:
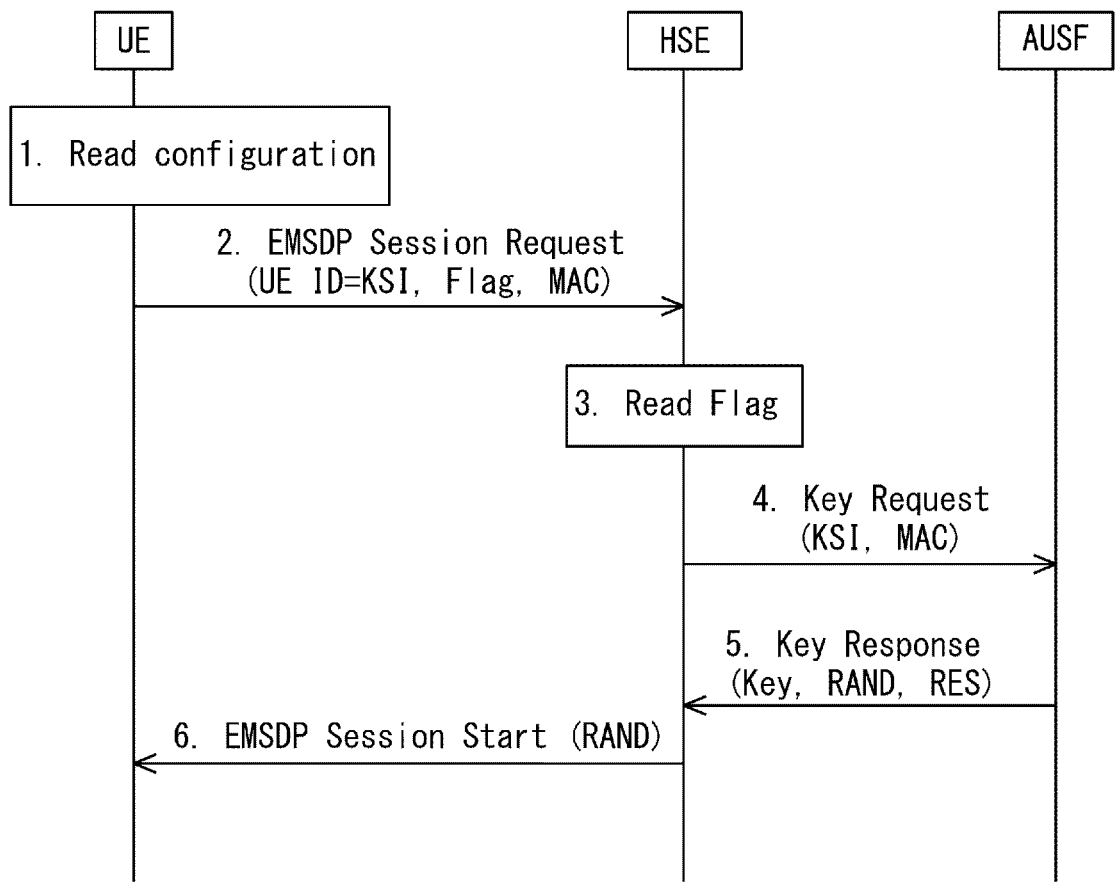
FIG. 20 illustrates an EMSDP Session Setup procedure for BEST technology in accordance with the present disclosure.
Figure 21:
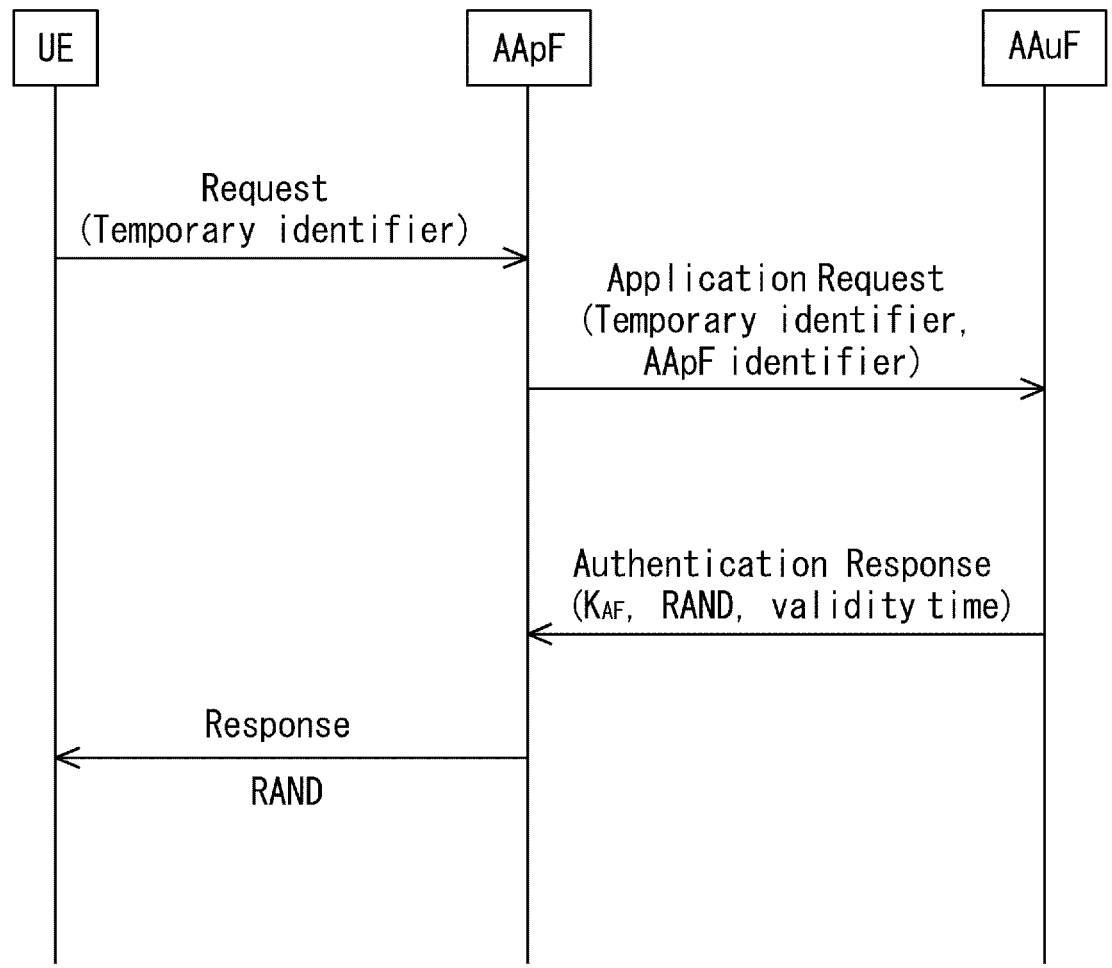
FIG. 21 illustrates an EMSDP Session Setup procedure for BEST technology in accordance with the present disclosure.
Figure 22:
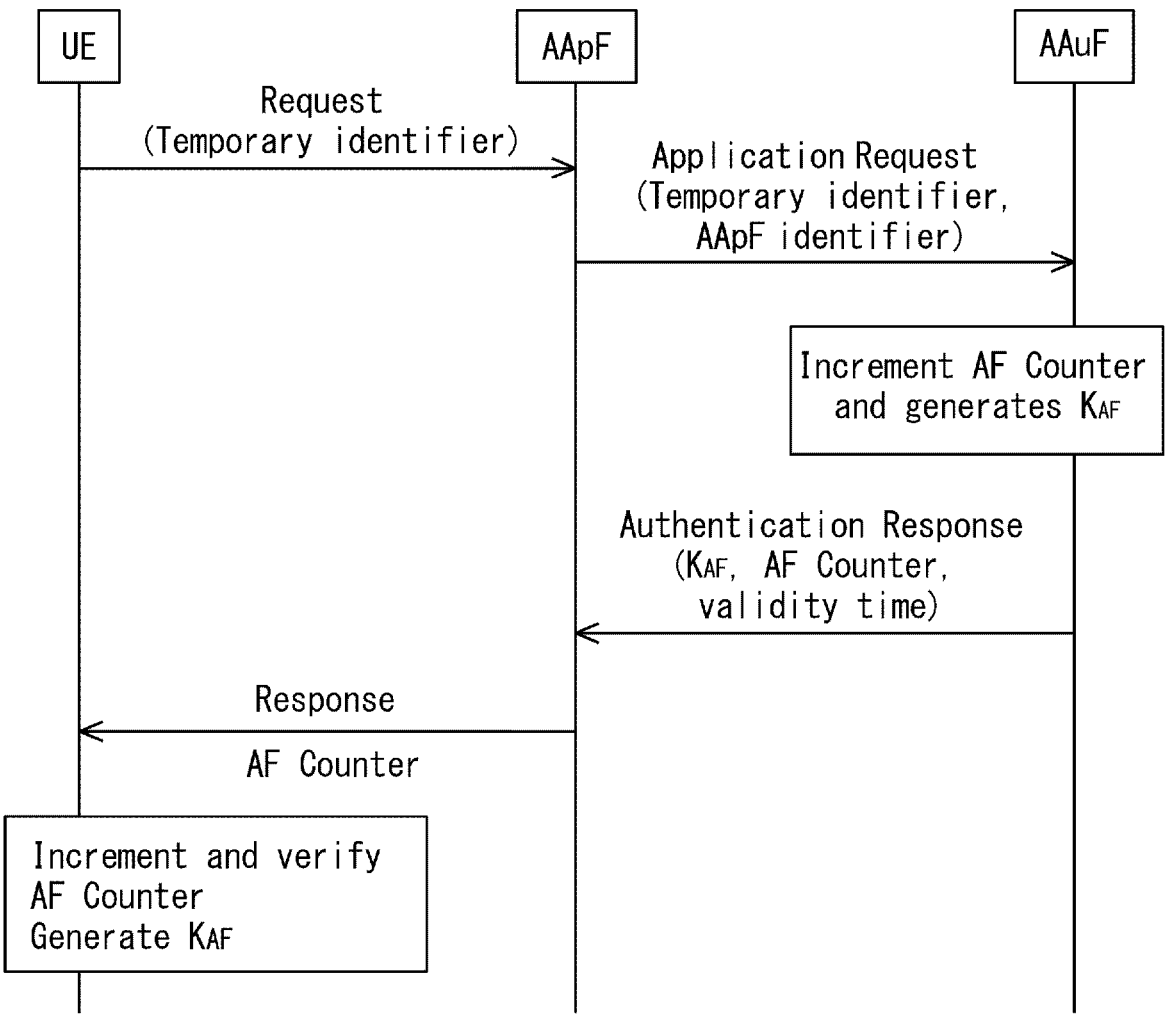
FIG. 22 illustrates an EMSDP Session Setup procedure for BEST technology in accordance with the present disclosure.

FIG. 17 shows an augmented flow to allow the UE to signal the usage of a key based on $K_{AUSF}$. In this flow, in the first step, the EMSDP Session Request message is expanded to also include a flag that the UE would like to use a key based on $K_{AUSF}$.

The EMSDP Session Start message that the UE sends is formatted as follows:
  CP flag is set to CP
  RFU is set to 0
  Key ID is set to 000
  CP COUNTER is set to 0
  The Session ID is set to all 0
  The EMSDP Command is set to EMSDP Session Request (10)
  The CMD Options are set to IMSI TLV, BEST UE Configuration TLV, and optionally, the Enterprise Setup Information Element TLV, and the Serving TLV.
  The MAC is not included, the Data length is set to 0, and the Data is empty.

In the BEST UE Configuration TLV, the UE sets one of the bits reserved for future use to 1 to indicate, to the HSE, that it would like to use the $K_{AUSF}$ for BEST key derivation. In case the HSE is a 5G enhanced HSE, the HSE will read the bit and request a BEST key from the AUSF. The AUSF will respond with a BEST Key, a RAND and a RES and forward it to the HSE. In turn, the HSE will forward the RAND to the UE so that the UE can derive the appropriate BEST key in the EMSDP Session Start message.

Variant 2

In variant 1, there was no possibility for the AUSF to verify that the message came from a legitimate UE. In this variant, the UE therefore also includes the $KSI_{KAUSF}$ and the MAC so that the AUSF can verify that the message came from a legitimate UE.

In order to do so, the UE includes two new TLVs in the CMD Options part of EMSDP Session Start message, namely the KSI TLV and the MAC TLV. In the KSI TLV, the UE includes the KSI of the AUSF, and in the MAC TLV, the UE includes the MAC. In the BEST UE Configuration TLV, the UE sets one of the bits reserved for future use to 1 to indicate, to the HSE, that it would like to use the $K_{AUSF}$ for BEST key derivation.

In case the HSE is a 5G enhanced HSE, the HSE will read the bit and request a BEST key from the AUSF by sending, to the AUSF, a message including the UE ID, the KSI and the MAC. The AUSF will verify the MAC and the KSI and if they match, respond with a key, a BEST Key, a RAND and a RES and forward it to the HSE. In turn, the HSE will forward the RAND to the UE so that the UE can derive the appropriate BEST key in the EMSDP Session Start message.

Variant 3

In variant 2, there was no backwards compatibility with an HSE that does not understand the new TLVs.

In this variant, that is solved by including a new round trip. In order to do so, the UE does not includes the two new TLVs in the CMD Options part of EMSDP Session Start message (the KSI TLV and the MAC TLV), but rather only sets one of the bits reserved for future use to 1 in the BEST UE Configuration TLV to indicate, to the HSE, that it would like to use the $K_{AUSF}$ for BEST key derivation.

In case the HSE is a 5G enhanced HSE, the HSE will read the bit and respond with a KSI and MAC request to the UE. The UE response with the KSI and MAC and after receiving these, the HSE will request a BEST key from the AUSF by sending, to the AUSF, a message including the UE ID, the KSI and the MAC. The AUSF will verify the MAC and the KSI and if they match, respond with a key, a BEST Key, a RAND and a RES and forward it to the HSE. In turn, the HSE will forward the RAND to the UE so that the UE can derive the appropriate BEST key in the EMSDP Session Start message.

The advantage of this approach is that only necessary data is sent. In case the HSE is not 5G enhanced, the UE will not have to send the KSI and the MAC saving battery power.

Variant 4

In variant 2, the IMSI value of the IMSI TLV in the EMSDP Session Request message was set to the IMSI value of the UE. In this variant, the UE has a configuration file for BEST and this configuration file tells the UE that the HSE is 5G compatible. As such, the UE does not include the IMSI, but rather includes the $KSI_{AUSF}$ in the IMSI field. The UE now also omits the KSI TLV because the KSI is already set in the IMSI TLV. In the BEST UE Configuration TLV, the UE sets one of the bits reserved for future use to 1 to indicate, to the HSE, that it would like to use the $K_{AUSF}$ for BEST key derivation.

Upon reception of the message, the HSE will read the bit and will request a BEST key from the AUSF by sending, to the AUSF, a message including the KSI and the MAC. The AUSF will lookup the key using the KSI and verify the message using the key. If they are correct, it will respond with a key, a BEST Key, a RAND and a RES and forward it to the HSE. In turn, the HSE will forward the RAND to the UE so that the UE can derive the appropriate BEST key in the EMSDP Session Start message.

The advantage of this approach is that some data can be omitted, namely the IMSI making it less privacy sensitive and avoiding an asymmetric calculation on the UE. Also because the IMSI is not sent, the battery power usage is reduced.

The advantage is to achieve that the AAuF and the UE together decide on the usage of the appropriate keys for AKMA.

The application specific keys are separated by both the application ID and a random or counter. This way it can be avoided that the key repeats even if the UE contacts the same service twice.

The derivation of an AKMA key can be avoided as follows:

In the previous embodiments, it was assumed that an AKMA key would be the root key for the AKMA service. Using this embodiment, there is no need to derive an AKMA key. In order to do so, the messages of FIG. 12 would be changed as follows:

Step 1: the AAuF sends an AKMA service request in the first step including the fields UE ID and optionally the material for the SEAF to verify the validity of the UE.

The SEAF would respond with an OK, indicating that it has the $K_{SEAF}$ in memory and that new keys can be derived.

The AAuF would send a temporary identifier back to the UE and stores the UE identifier.

Figure 23:
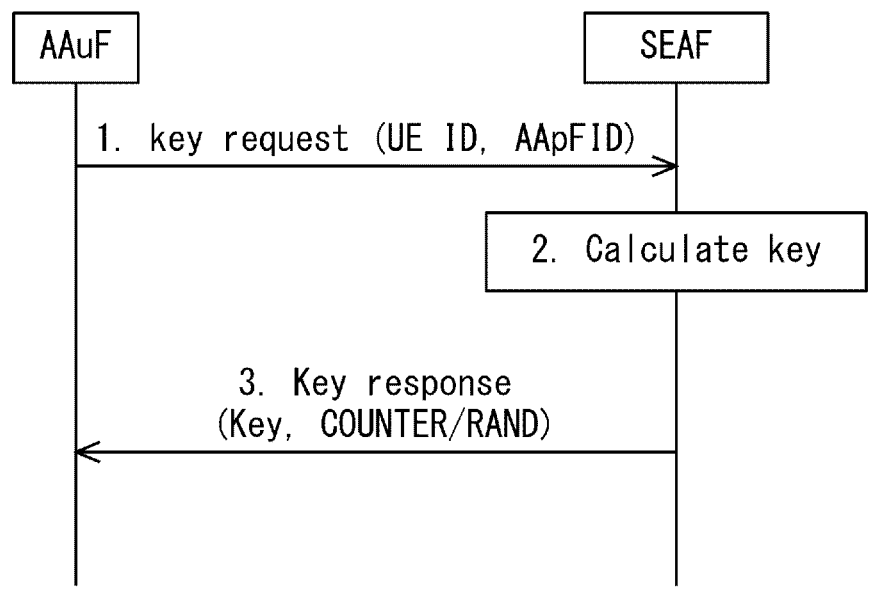
FIG. 23 shows a calculation of the AF key by SEAF or AUSF in accordance with the present disclosure.

Subsequently, for each service requesting a key, the following procedure would be followed by the AAuF (see FIG. 23):

The AAuF requests a key from the SEAF using the UE ID that was stored and retrieved after receiving the temporary UE ID and the AApFID to the SEAF The SEAF response with a Key, and the COUNTER or RAND that is used.

In the above, where it said SEAF, this could be replaced with AUSF to obtain the procedure for usage with the AUSF Example of Using the $K_{AKMA}$ Key for Application Keys After derivation of the $K_{AKMA}$, the application is not yet ready to be used. The application server first needs to obtain a key that is meant for the application server. There are two ways to obtain cryptographic key separation for application server keys.

Variant 1

In this variant, a RAND is used to create key separation between the different AAuFs. This works as follows:

The UE sends a service request with a temporary identifier to the AApF.

The AApF contacts the AAuF using an application request including the UE's temporary identifier and an identifier unique to the AApF.

The AAuF derives a application specific key as follows:

$K_{AF}$=KDF(input key,AApFID,RAND)

and sends the RAND and key and its associated validity time to the AApF.

The AApF sends the RAND to the UE which calculates the KAF similar to the AAuF using:

$K_{AF}$=KDF(input key,AApFID,RAND).

If the AApFID is not known to the UE, the AApF also includes the AApFID in the message that also includes the RAND.

The temporary identifier used by the UE can be a temporary identifier assigned by the AAuF during the bootstrapping or key agreement procedure described in the earlier embodiments. This identifier is therefore expected to vary with every new bootstrap or key agreement procedure.

Variant 2

In this variant, an Application Function (AF) COUNTER is used to create key separation between the different AAuFs. The UE and the AKMA authentication function (either AAuF or AUSF) initializes the AF Counter to '0' whenever an AKMA anchor key ($K_{AKMA}$) is generated for a UE based on a 3GPP credential in 5G. The AF counter can be monotonically incremented for every new application key ($K_{AF}$) generation and used as an input during $K_{AF}$ generation from the same $K_{AKMA}$. The AF counter specific to the UE is managed by both the UE and the AKMA authentication function. This works as follows:

The UE sends a service request with a temporary identifier to the AApF.

The AApF contacts the AAuF using an application request including the UE's temporary identifier and an identifier unique to the AApF.

The AAuF increments the locally stored AF Counter and derives an application specific key as follows:

$K_{AF}$=KDF(input key,AApFID,AF COUNTER)

and sends the AF COUNTER and key and its associated validity time to the AApF.

The AApF sends the AF COUNTER to the UE which calculates the $K_{AF}$ similar to the AAuF using:

$K_{AF}$=KDF(input key,AApFID,AF COUNTER).

Before the derivation, the UE will verify whether the AF COUNTER value that was received matches the AF COUNTER value that is kept in the UE after incrementing it with 1. Only if the verification is successful, the UE will calculate the $K_{AF}$. If the AApFID is not known to the UE, the AApF also includes the AApFID in the message that also includes the AF COUNTER.

The AF COUNTER is reset to 0 every time a new key for the AKMA service is derived for the UE or when a fresh key is obtained by the AAuF for the UE. In case multiple AKMA security associations exist, the counter would be key specific (so one for $K_{AKMA}$, one for $K_{SEAF}$, and one for $K_{AUSF}$).

In order to allow for sufficient counter space, a 16 bit counter could be used.

Figure 24:
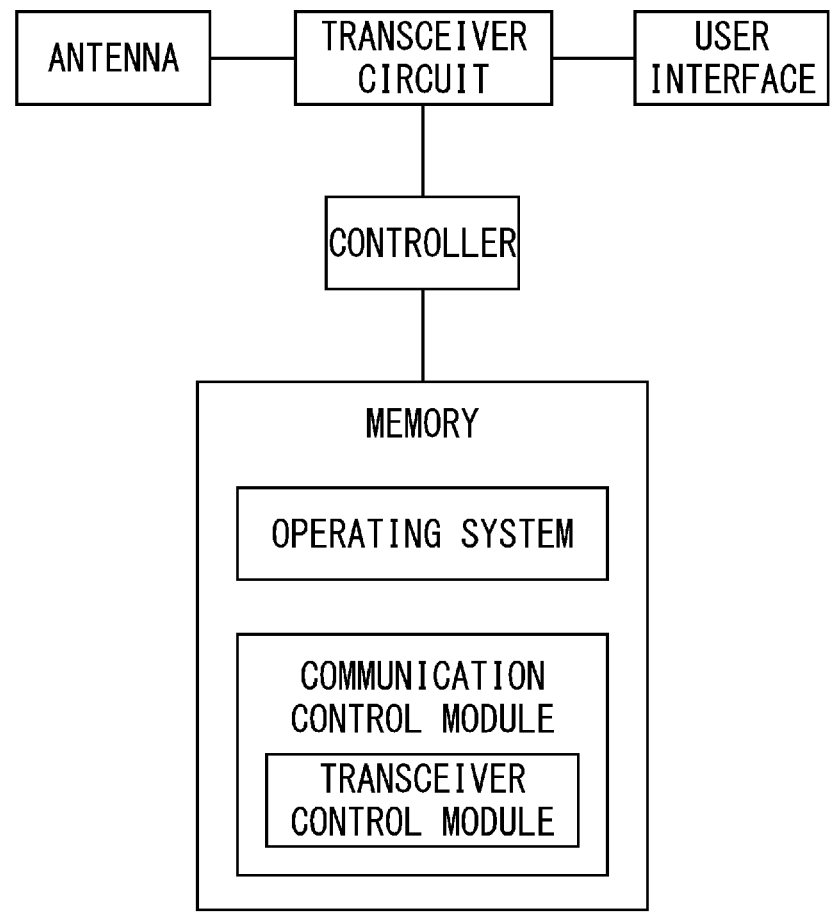
FIG. 24 shows a block diagram for a User Device (UE) in accordance with the present disclosure.

FIG. 24 is a block diagram illustrating the main components of the UE. As shown, the UE includes a transceiver circuit which is operable to transmit signals to and to receive signals from the connected node(s) via one or more antenna. Although not necessarily shown in FIG. 24, the UE will of course have all the usual functionality of a conventional mobile device (such as a user interface) and this may be provided by any one or any combination of hardware, software and firmware, as appropriate. Software may be pre-installed in the memory and/or may be downloaded via the telecommunication network or from a removable data storage device (RMD), for example.

A controller controls the operation of the UE in accordance with software stored in a memory. For example, the controller may be realized by Central Processing Unit (CPU). The software includes, among other things, an operating system and a communications control module having at least a transceiver control module. The communications control module (using its transceiver control sub-module) is responsible for handling (generating/sending/receiving) signalling and uplink/downlink data packets between the UE and other nodes, such as the base station/(R)AN node, a MME, the AMF (and other core network nodes). Such signalling may include, for example, appropriately formatted signalling messages relating to connection establishment and maintenance (e.g. RRC messages,), NAS messages such as periodic location update related messages (e.g. tracking area update, paging area updates, location area update) etc.

Figure 25:
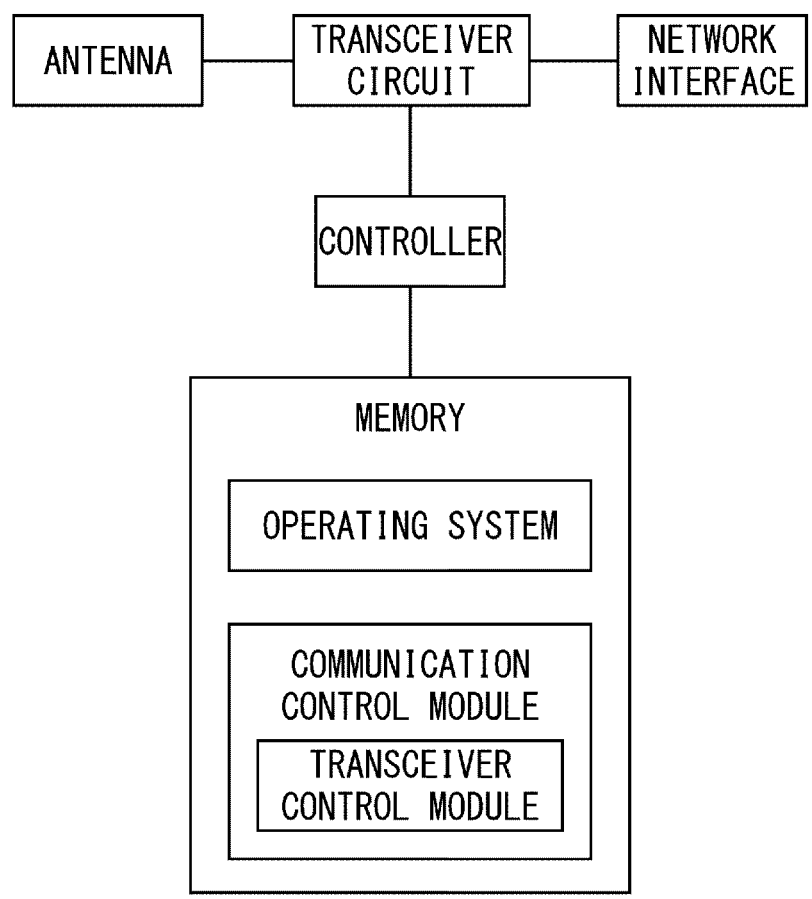
FIG. 25 shows a block diagram for an (R)AN node in accordance with the present disclosure.

FIG. 25 is a block diagram illustrating the main components of an exemplary (R)AN node, for example a base station ('eNB' in LTE, 'gNB' in 5G). As shown, the (R)AN node includes a transceiver circuit which is operable to transmit signals to and to receive signals from connected UE(s) via one or more antenna and to transmit signals to and to receive signals from other network nodes (either directly or indirectly) via a network interface. A controller controls the operation of the (R)AN node in accordance with software stored in a memory. For example, the controller may be realized by Central Processing Unit (CPU). Software may be pre-installed in the memory and/or may be downloaded via the telecommunication network or from a removable data storage device (RMD), for example. The software includes, among other things, an operating system and a communications control module having at least a transceiver control module.

The communications control module (using its transceiver control sub-module) is responsible for handling (generating/sending/receiving) signalling between the (R)AN node and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case.

The controller is also configured (by software or hardware) to handle related tasks such as, when implemented, UE mobility estimate and/or moving trajectory estimation.

Figure 26:
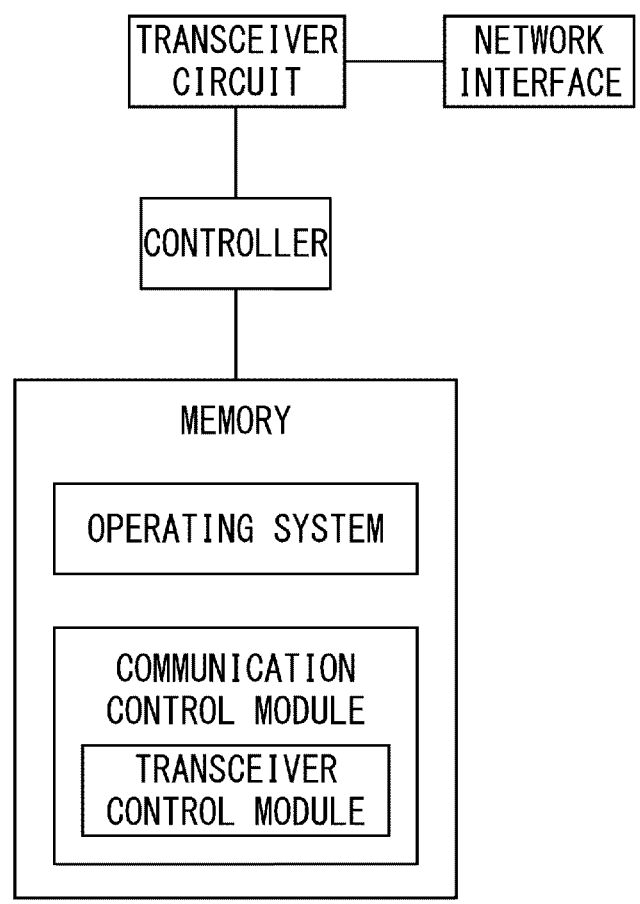
FIG. 26 shows a block diagram for a core network node in accordance with the present disclosure.

FIG. 26 is a block diagram illustrating the main components of an exemplary core network node, for example an AMF, a SEAF, an AUSF, an UDM, an ARPF, an AAuF, an AApF or any other core network node. The AMF may comprise a SEAF. The AMF provides mobility management and registration management in the network and can also be called a mobility management node. The SEAF can be called a security anchor function and provides the storage and management of an anchor key in the network. The UDM is a subscriber registration and may also comprise an ARPF as credential storage. Additionally, the UDM may also comprise a SIDF (Subscription Identifier De-concealing Function) for providing a service for deconcealing of the concealed permanent identifier. The AUSF is an authentication function and provides a front end to the UDM. Additionally, the AUSF may also comprise a storage for storing an anchor key. The UDM and/or the combination of any of UDM/ARPF/SIDF can be called a subscriber database. The AAuF and/or the AApF can be called an AKMA service node. The core network functions can also be split up in further logical units or combined into larger logical units. Due to the nature of the service based interface, such combinations or splits do not affect the functionality and the word node can therefore refer to any combination of the core network functionalities. The core network node is included in the 5GC. As shown, the core network node includes a transceiver circuit which is operable to transmit signals to and to receive signals from other nodes (including the UE) via a network interface. A controller controls the operation of the core network node in accordance with software stored in a memory. For example, the controller may be realized by Central Processing Unit (CPU). Software may be pre-installed in the memory and/or may be downloaded via the telecommunication network or from a removable data storage device (RMD), for example. The software includes, among other things, an operating system and a communications control module having at least a transceiver control module.

The communications control module (using its transceiver control sub-module) is responsible for handling (generating/sending/receiving) signalling between the core network node and other nodes, such as the UE, base station/(R)AN node (e.g. "gNB" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

The User Equipment (or "UE", "mobile station", "mobile device" or "wireless device") in the present disclosure is an entity connected to a network via a wireless interface.

It should be noted that the UE in this specification is not limited to a dedicated communication device, and can be applied to any device, having a communication function as a UE described in this specification, as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery.

It will be appreciated that the terms "UE" and "wireless device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE may support one or more IoT or MTC applications. Some examples of MTC applications are listed in the following table (source: 3GPP TS 22.368 V13.1.0). This list is not exhaustive and is intended to be indicative of some examples of machine-type communication applications.

TABLE 1

Some examples of machine-type communication applications.

| Service Area | MTC applications |
|---|---|
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary embodiments described in the present document. Needless to say, these technical ideas and embodiments are not limited to the above-described UE and various modifications can be made thereto.

As will be appreciated by one of skill in the art, the present disclosure may be embodied as a method, and apparatus. Accordingly, the present disclosure may take the form of an entirely hardware embodiment, a software embodiment or an embodiment combining software and hardware aspects.

It will be understood that each block of the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the drawings and specification, there have been disclosed exemplary embodiments of the disclosure. Although specific terms are employed, they are used in a generic and descriptive sense only and not for purposes of limitation, the scope of the disclosure being defined by the following claims.

The whole or part of the exemplary embodiments disclosed above can be described as, but not limited to, the following supplementary notes.

Supplementary Note 1

A method of enabling key re-usage for an electronic device, the method comprising:
receiving a request message from the electronic device, wherein the request message comprises a first information being indicative of a preference for one of a first key associated with a first network node in a first network or a second key associated with a second network node in a second network;
processing the request message to determine the preference indicated in the first information; and
transmitting a response message to the electronic device for reusing the first key or second key,
wherein the electronic device is configured to derive a third key based on the first key or the second key as indicated in the determined preference, and
wherein the second network is able to access the first key and the second key and the first network is unable to access the second key.

Supplementary Note 2

The method according to Supplementary note 1, wherein the request message comprises a second information being indicative of the electronic device holding at least one of the first key or the second key, a third information being indicative of identity of a key established during a previous communication session or a fourth information being indicative of local policy.

Supplementary Note 3

The method according to Supplementary note 1, wherein the first key is established between the first network and the electronic device and the second key is established between the second network and the electronic device in an authentication session.

Supplementary Note 4

The method according to Supplementary note 1, wherein the method comprises:
  setting up an authentication pattern using the first key or the second key based on the preferences of the UE; and
  obtaining one of the first key or the second key chosen by the first network or the second network based on the first information.

Supplementary Note 5

A method of enabling key re-usage for an electronic device at a network other than home network, the method comprises:
  sending a service request to the network other than the home network;
  receiving a service response in respect of the service request; and
  performing an authentication based on the received service response.

Supplementary Note 6

The method according to Supplementary Note 5, wherein the method comprises:
  verifying a key present in the service request in respect of the network other than the home network;
  verifying a home network in an event of failure of verification of the key; and
  receiving an authorization request in an event of failure of verification with the home network.

Supplementary Note 7

The method according to Supplementary Note 5, wherein the method comprises:
  verifying the received service response;
  calculating an appropriate key based on the verification; and
  authenticating the service response based on the calculated key.

Supplementary Note 8

The method according to Supplementary Note 5, wherein the service response comprises at least one of a set of parameter, a message authentication code, or a key indicator.

Supplementary Note 9

A method of enabling key re-usage for an electronic device in a network, the method comprising:
  transmitting at least one session request message to a first network node, wherein the at least one session request message comprises a flag to indicate that the electronic device's preference to use a key based on an authentication key associated with a second network node, wherein the flag is forwarded to a third network node in form of at least one key request, and wherein the third network node sends a at least one response message to the first network node upon successful verification of the at least one key request; and
  receiving a message from the first network node indicating the session to commence.

Supplementary Note 10

The method according to Supplementary Note 9 wherein the second network node and the third network node are the same network node.

Supplementary Note 11

The method according to Supplementary Note 9, wherein the at least one session request message comprises at least one of an ID, a flag, an authentication key of the server, a key set identifier, or a message authentication code.

Supplementary Note 12

The method according to Supplementary Note 9, wherein the at least one key request message comprises at least one of an ID, an authentication key of the server, a key set identifier, or a message authentication code.

Supplementary Note 13

The method according to Supplementary Note 9, wherein the at least one key response message comprises at least one of an authentication key of the server, a challenge code, or a verified response message.

Supplementary Note 14

The method according to any of Supplementary notes 1, 5, or 9, wherein either a challenge code or an authentication key specific counter is used for key separation in an event of a plurality of the applications or application functions.

Supplementary Note 15

The method according to any of Supplementary notes 1, 5, or 9, wherein a random number is used for key separation in an event of a plurality of the applications or application functions.

Supplementary Note 16

A network node for communication with an electronic device, the network node comprising:
  a controller; and
  a memory operatively coupled with the controller, wherein the controller is configured to:
    receive a request message from the electronic device;
    process the request message to have a result for implementing of an authentication based on a set of parameters; and
    transmit the result to the electronic device for deriving a set of authentication keys.

Supplementary Note 17

An electronic device for re-using a key with a network, the electronic device comprising:
  a controller; and
  a memory operatively coupled with the controller, wherein the controller is configured to:

send a service request to the network;
receive a service response in respect of the service request; and
perform an authentication based on the received service response.

This application is based upon and claims the benefit of priority from Indian patent application No. 201911001407, filed on Jan. 11, 2019, the disclosure of which is incorporated herein in its entirety by reference.

What is claimed is:

1. A method of a network node for an Authentication and Key Management for Applications (AKMA) procedure in a fifth generation mobile network (5G), the method comprising:
receiving, from an Authentication Server Function (AUSF), an AKMA Anchor Key (KAKMA), derived based on KAUSF (AUSF key), for an authentication of an application within 5G;
receiving a message, from an application function for the AKMA procedure, including a temporary identifier of a User Equipment (UE) and an identifier unique to the application function;
deriving an application key (KAF) based on the identifier unique to the application function and the KAKMA; and
sending the KAF to the application function,
wherein the application function is different from the UE, and
wherein the network node is different from the UE; and
using the KAF to secure a communication between the UE and the application function.

2. The method according to claim 1, wherein the message is a message to request a key for the application.

3. The method according to claim 1, further comprising:
deriving another application key (KAF) for another application,
wherein the temporary identifier of the UE is sent from the UE to the application function.

4. The method according to claim 1, wherein the KAF is sent along with an expiration time of the KAF.

5. A network node for an Authentication and Key Management for Applications (AKMA) procedure in a fifth generation mobile network (5G), the network node comprising:
at least one memory configured to store instructions; and
at least one processor configured to execute the instructions to:
receive, from an Authentication Server Function (AUSF), an AKMA Anchor Key (KAKMA), derived based on KAUSF (AUSF key), for an authentication of an application within 5G;
receive a message, from an application function for the AKMA procedure, including a temporary identifier of a User Equipment (UE) and an identifier of the application function;
derive an application key (KAF) based on the identifier unique to the application function and the KAKMA; and
send the KAF to the application function,
wherein the application function is different from the UE, and
wherein the network node is different from the UE; and
using the KAF to secure a communication between the UE and the application function.

6. The network apparatus according to claim 5, wherein the message is a message to request a key for the application.

7. The network apparatus according to claim 5,
wherein the at least one processor is configured to execute the instructions to derive another application key (KAF) for another application, and the temporary identifier of the UE is sent from the UE to the application function.

8. The network apparatus according to claim 5, wherein the KAF is sent along with an expiration time of the KAF.

9. A method of a User Equipment (UE) communicating with a fifth generation mobile network (5G), the method comprising:
sending, to an application function for an Authentication and Key Management for Applications (AKMA) procedure in 5G, a first message including a temporary identifier of the UE,
wherein the temporary identifier of the UE and an identifier unique to the application function are received by a network node from the application function, wherein the network node and the application function are different from the UE;
deriving an AKMA Anchor Key (KAKMA) based on an Authentication Server Function (AUSF) key (KAUSF), for authentication of an application within 5G,
wherein the KAKMA is used for deriving a first application key (KAF), corresponding to a second KAF derived by the network node communicating with the application function, wherein the identifier unique to the application function and the KAKMA are used for deriving the second KAF, and wherein the second KAF is sent from the network node to the application function; and
using the first KAF to secure a communication between the UE and the application function.

10. The method according to claim 9, further comprising:
deriving the first KAF, corresponding to the second KAF derived by the network node communicating with the application function, from the KAKMA.

11. The method according to claim 9,
wherein an expiration time of the second KAF is sent from the network node to the application function.

12. A User Equipment (UE) communicating with a fifth generation mobile network (5G), the UE comprising:
at least one memory configured to store instructions; and
at least one processor configured to execute the instructions to:
send, to an application function for an Authentication and Key Management for Applications (AKMA) procedure in 5G, a first message including a temporary identifier of the UE,
wherein the temporary identifier of the UE and an identifier unique to the application function are received by a network node from the application function, wherein the network node and the application function are different from the UE; and
derive an AKMA Anchor Key (KAKMA) based on an Authentication Server Function (AUSF) key (KAUSF), for authentication of an application within 5G,
wherein the KAKMA is used for deriving a first application key (KAF), corresponding to a second KAF derived by the network node communicating with the application function wherein the identifier unique to the application function and the KAKMA are used for deriving the second KAF, and wherein the second KAF is sent from the network node to the application function; and
using the first KAF to secure a communication between the UE and the application function.

13. The UE according to claim 12, wherein the at least one processor is configured to execute the instructions to derive the first KAF, corresponding to the second KAF derived by the network node communicating with the application function, from the KAKMA.

14. The UE according to claim 12,
wherein an expiration time of the second KAF is sent from the network node to the application function.

\* \* \* \* \*